United States Patent [19]
Takei

[11] Patent Number: 6,006,019
[45] Date of Patent: Dec. 21, 1999

[54] NETWORK SYSTEM CAPABLE OF MANAGING A NETWORK UNIT FROM AN AGENT

[75] Inventor: Masahiro Takei, Tokyo, Japan

[73] Assignee: NEC Corporation, Japan

[21] Appl. No.: 08/694,568

[22] Filed: Aug. 9, 1996

[30] Foreign Application Priority Data

Aug. 10, 1995 [JP] Japan ................................. 7-204872
Feb. 28, 1996 [JP] Japan ................................. 8-067113

[51] Int. Cl.[6] ........................................................ G06F 13/00
[52] U.S. Cl. ........................................................ 395/200.54
[58] Field of Search ........................ 395/200.53, 200.54, 395/180, 181, 182.02, 183.19, 200.5, 200.74; 370/241, 242, 244, 245, 254; 371/20.1, 20.6, 68.2

[56] References Cited

U.S. PATENT DOCUMENTS

| | | | |
|---|---|---|---|
| 5,307,354 | 4/1994 | Cramer et al. ................... | 395/182.02 |
| 5,461,628 | 10/1995 | Nakamura ........................ | 395/183.15 |
| 5,504,863 | 4/1996 | Yoshida .............................. | 395/184.01 |
| 5,513,343 | 4/1996 | Sakano et al. ..................... | 395/183.02 |
| 5,559,955 | 9/1996 | Dev et al. .......................... | 395/182.02 |
| 5,621,664 | 4/1997 | Phaal ...................................... | 345/418 |

FOREIGN PATENT DOCUMENTS 5-204811  8/1993  Japan .

*Primary Examiner*—Moustafa M. Meky
*Attorney, Agent, or Firm*—Ostrolenk, Faber, Gerb & Soffen, LLP

[57] ABSTRACT

In a network management system for managing a network unit from an agent, an internal memory is included in the network unit to store current managed data signals while an agent internal memory is included in the agent to transcribe the current managed data signals from the network unit to the agent by a polling processing unit of the agent. The polling processing unit can acquire the current managed data signals from a zone of the internal memory at a time when the network unit is polled by accessing the zone of the internal memory. Alternatively, an alarm data signal which is representative of a detail of a fault is transferred from the network unit to the agent through an interface which is included in each of the network unit and the agent and which is used in common to transmission of managned data signals. Both the interfaces are connected to each other through a transmission path. An alarm signal indicative of occurrence of the fault is transmitted from the network unit to the agent through an interruption line and the common interface which is included in each of the network unit and the agent.

36 Claims, 31 Drawing Sheets

NETWORK SYSTEM CAPABLE OF MANAGING A NETWORK UNIT FROM AN AGENT

BACKGROUND OF THE INVENTION

This invention relates to a network system which includes a managing unit and a managed unit which is managed by the managing unit and which may be therefore called a network management system. It is to be noted throughout the instant specification that the managed unit is practically a communication package (simply called a package) which is located in a slot formed within a housing and which will be often referred to as a network unit and that the managing unit may be practically an agent. At any rate, the agent is located between the manager and the communication package, namely, the network unit and is operable to execute a management operation instead of the manager.

A conventional network system of the type described includes an agent connected to a manager and a plurality of network units communicable with the agent. In order to carry out management operation, a command is issued from the agent to each of the network unit while a response is sent from each of the network units to the agent in response to the command. With this structure, each of the network units must have an interface which can interpret the command, collect a data signal to be managed (namely, a managed data signal), and form a response format. Therefore, the interface is intricate in structure.

In addition, the agent carries out polling operation to each of the network units to acquire the managed data signals from the network units by delivering a specified command to each network unit. The managed data signals are sent back to the agent as the responses.

Herein, it is to be noted that a restricted amount of the managed data signal alone is extracted each time when the single polling operation is carried out. Accordingly, the polling operation should be repeated again and again to extract a great deal of the managed data signals from the network unit. This degrades a transmission efficiency.

Alternatively, a proposal has been made about a network system or a network management system which is described in Japanese Unexamined Publication No. Hei 5-204811, namely, 204811/1993, and which has an agent and a network unit. Such a network system proposed is effective to quickly transmit an alarm signal from the network unit to the agent when a fault takes place in each of the network units. In addition, it is also possible to quickly collect the alarm signal from each network unit and to transfer the alarm signal to the manager.

For this purpose, each of the agent and the network unit includes a connection oriented communication interface and a connectionless communication interface. In addition, the connection oriented communication interface and the connectionless communication interface of the agent are communicable with those of the network unit, respectively. With this structure, the connection oriented communication interfaces in the agent and the network unit are used for communication which is triggered by the agent and which is made, for example, to acquire data signals of the network unit by the agent. On the other hand, the connectionless communication interfaces in the agent and the network unit are used for communication which is triggered-by the network unit and which is made, for example, to urgently or emergently transmit the alarm signal from the network unit to the agent. Thus, emergent communication can be carried out between the network unit and the agent by the use of the connectionless communication interfaces.

Herein, it should be considered in connection with the above-referenced network system that occurrence of an emergent event, such as occurrence of a fault, must finally be reported to the manager which is connected to the agent. However, two different kinds of the interfaces should be prepared in the above-referenced network system in the manager, the agent, and the network unit. This brings about complexity of the network system. In addition, each of the connectionless communication interfaces has a low reliability, as mentioned in the referenced Japanese Unexamined Patent Publication and acknowledgement should be made each time when communication is carried out through the connectionless communication interfaces.

In general, managed data signals acquired by the managing unit are preferably classified so as to effectively manage the managed data signals. However, no consideration is made at all about different attributes of the managed data signals.

Moreover, it is preferable that the alarm signal is quickly transmitted through the agent to the manager, regardless of a load imposed on the agent. However, the transmission of the alarm signal-is practically delayed as the load imposed on the agent becomes heavy.

SUMMARY OF THE INVENTION

It is an object of this invention to provide a network system which can effectively and quickly carry out a polling operation from an agent to each network unit without repeating the polling operation.

It is another object of this invention to provide a network system which is capable of simplifying a structure of each of a managed unit and a managing unit, such as an agent.

It is still another object of this invention to provide a network system of the type described, which has a high reliability and which dispenses with necessity of acknowledgement.

It is a further object of this invention to provide a network system which is capable of effectively managing managed data signals in consideration of attributes of the managed data signals.

It is yet another object of this invention to provide a network system of the type described, which is capable of reducing a load imposed on the agent to quickly transmit an alarm signal to a manager.

A network system to which this invention is applicable includes a managing unit which may be an agent for managing the network system in lieu of a manager and a plurality of managed units which may be communication packages or network units and which are connected to the agent through a transmission path. According to an aspect of this invention, each of the managed units includes a first internal memory for storing managed data signals which are transcribed from various portions of each managed unit and which are renewed into current managed data signals. The managed data signals are collected in the first internal memory of each managed unit and accessed by the managing unit to be collectively managed by the managing unit.

Specifically, the first internal memory has a transfer area for storing the managed data signals which are to be transferred to the managing unit and which may be, for example, attribute data signals (such as an end point information signal), status data signals, performance data signals (such as an error rate), alarm signals. The managed data signals in the transfer area are updated or renewed by the use of a package data transcriber included in each managed unit and are accessed by a first communication management unit of each managed unit in response to an indication which is issued from the managing unit and which specifies a zone or an area of the first internal memory.

With this structure, the managing unit can acquire the current managed data signals from the zone at a time by polling each managed unit. To this end, the managing unit includes a second communication management unit and a polling processing unit which informs the first internal memory of the zone or area to be polled through the second communication management unit and which acquires the managed data signals sent from each managed unit at a time.

Herein, the managed data signals stored in the first internal memory are classified into first, second, and third groups. The first group of the managed data signals is directly transcribed from the first internal memory to the second internal memory included in the managing unit. On the other hand, the second group of the managed data signals is acquired by the polling and compared with previous values stored in the second internal memory while the third group of the managed data signals is acquired by the polling and are compared with threshold values to detect whether or not the managed data signal cross the threshold values. All of the first through the third groups of the managed data signals are acquired from each managed unit at a time in response to the indication or command and are individually and sequentially processed in the managing unit.

Since addresses of the first through the third groups in the first internal memory must be made to correspond to addresses of the second internal memory, an address relationship between the first and the second internal memories is kept in an information storage unit of the managing unit. The polling processing unit accesses the information storage unit to detect the area or zone to be accessed from the information storage unit and acquires the managed data signals of the first through the third groups at a time from the first internal memory of each managed unit. Although the first group of the managed data signals are directly transcribed into the second internal memory, the second and the third groups of the managed data signals are compared with the previous values and the threshold values to be sent to an event notifying unit.

The managed data signals, such as alarm data signals, should be quickly transmitted from each managed unit to the managing unit without waiting for the polling and may be classified into a fourth group of the managed data signals stored in the transfer area. When the fourth group of the managed data signals is changed in each managed unit, such a change of the fourth group is asynchronously transmitted from each managed unit to an asynchronous event processing unit of the managing unit together with addresses of the first internal memory. The fourth group of the managed data signals is asynchronously transcribed into the second internal memory and is informed to the event notifying unit.

In addition, the first internal memory in each managed unit has a nontransfer area for storing managed data signals, such as various protection signals, initialization signal, which are transferred from the managing unit to each managed unit. Such managed data signals are transcribed into the nontransfer area by the memory transcriber unit but are not transcribed into the managing unit. Instead, virtual addresses are prepared in the second internal memory and managed by the information storage unit.

An on demand processing unit is also prepared in the managing unit to transfer the managed data signals from the managing unit to the nontransfer area of the first internal memory. Such transfer is carried out at a time by indicating an area to be accessed.

In this case, when the information storage unit is included in the managing unit, data acquisition and setting becomes possible by indicating only addresses in the second internal memory without recognizing addresses of the managed units.

According to another aspect of this invention, the network system comprises an information path connected between the managing unit and each managed unit to carry out an access operation of each managed unit to transfer both the managed data signals and an alarm data signal from each managed unit to the managing unit and an interruption line connected between the managing unit and each managed unit to transfer an alarm signal which is representative of occurrence of a fault in the managed unit and which is sent from each managed unit to the managing unit before transfer of the alarm data signal. With this structure, a common communication interface is used in each of the managing unit and each managed unit to transfer both the managed data signals and the alarm data signal.

DESCRIPTION OF THE PREFERRED EMBODIMENTS

Figure 1:
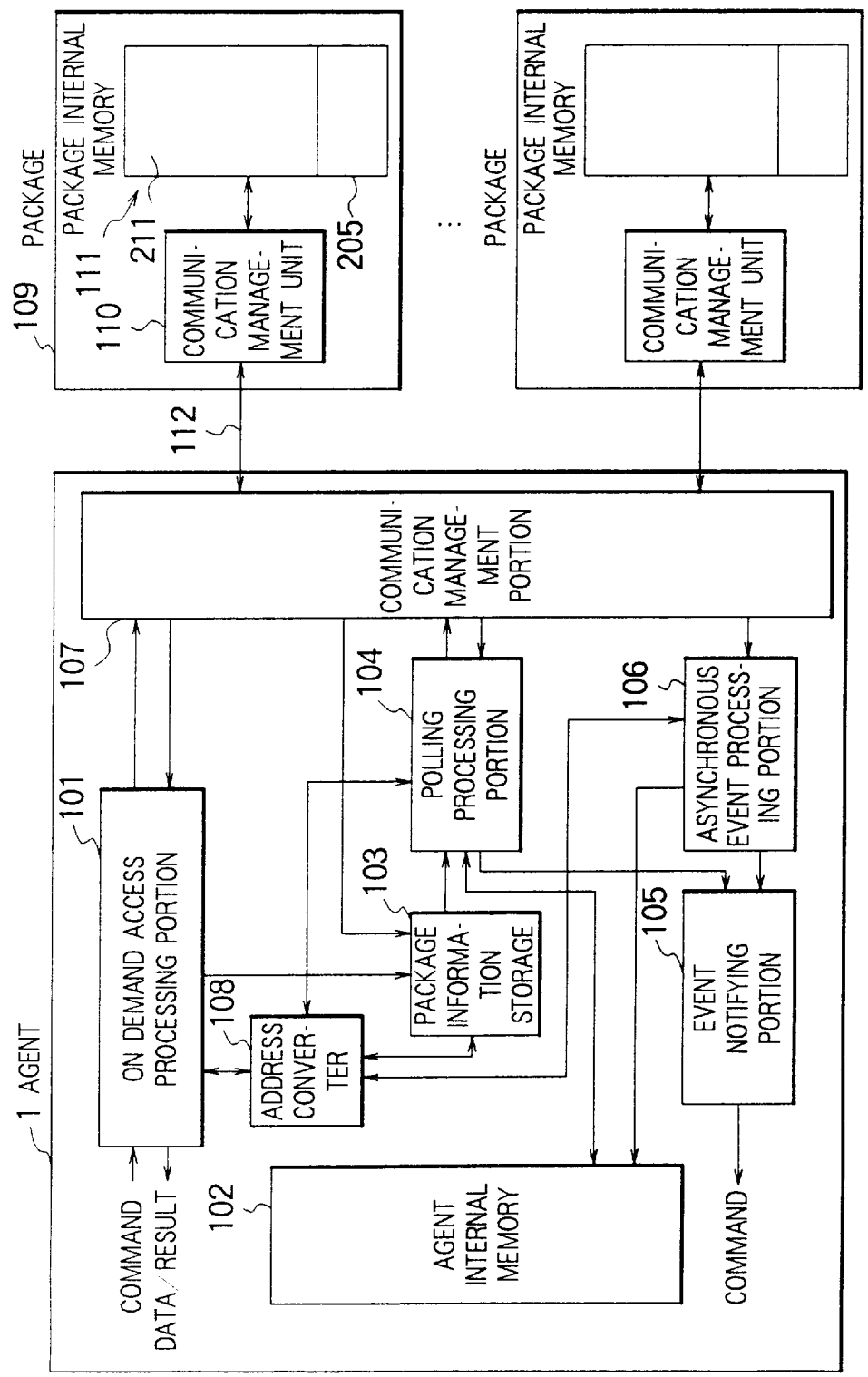
FIG. 1 is a block diagram of a network system according to a first embodiment of this invention.

Referring to FIG. 1, a network system according to a first embodiment of this invention comprises an agent 1 and a plurality of communication packages 109 (simply called packages hereinunder) controlled by the agent 1. The agent 1 is connected through a transmission path 112 to the plurality of the packages 109. Herein, the agent 1 acts as management substitute or agent equipment which is located between a manager (not shown in this figure) and the packages 109 and which carries out OSI network management in place of the manager. On the other hand, each of the illustrated packages 109 serves to transmit or receive a main information signal, such as a data signal, a command signal, to or from the agent 1, rather than a supervisory information signal and may therefore be called a main signal package also.

Practically, each of the packages 109 is implemented by a board and LSIs mounted on the board to execute information processing and so on in an exchange, a transmission device, and is inserted within a slot of an equipment body or a housing. The packages 109 are electrically connected through the transmission path 112 to the agent 1 which is structured on a board.

Each of the packages 109 includes a management section or portion which is concerned with network management. Specifically, the management section is specified by a package internal memory 111 for memorizing a copy of data signals to be managed (managed data signals) and a communication management unit 110 which executes processings of transmitting the managed data signals to the agent by accessing the package internal memory 111 or the like.

The package internal memory 111 has a transfer area 211 and a nontransfer area 205. The transfer area 211 is for storing the managed data signals which are to be managed and which are transferred from the package 109 to the agent 1 while the nontransfer area 205 is for storing managed data signals which are sent from the agent 1. As mentioned later in detail, each of the packages 109 transcribes newest ones of the managed data signals in each package 109 in itself into the transfer area 211 of the package internal memory 111 while newest ones of the data signals to be sent from the agent 1 are transcribed in the nontransfer area 205 as current managed data signals.

It is to be noted that the package internal memory 111 is subjected to exclusive control by an access device so as to avoid an access operation from any other elements or circuits. As a result, an exclusive right is given to the access device before accessing the internal memory 111. Thereafter, the access device accesses the package internal memory 111.

On the other hand, the agent 1 includes, as structural elements, an agent internal memory 102, a communication management portion 107 connected to the transmission path 112, a polling processing portion 104, an on demand access processing portion 101, an asynchronous event processing portion 106, an event notifying portion 105, a package information storage 103, and an address converter 108. The communication management portion 107 may be referred to as an agent communication management unit.

Herein, the structural elements will be briefly described for an understanding of this invention. At first, the agent internal memory 102 serves to store contents of the transfer area 211 transferred from each package internal memory 111 of the packages 109. The polling processing portion 104 is connected to the communication management portion 107, the address converter 108, the package information storage 103, the agent internal memory 102, and the event notifying portion 105 and acts to autonomously polling the packages 109 in accordance with a command sent from an external portion, such as the manager. The on demand access processing portion 101 is connected to the external portion, such as the manager, the address converter 108, the package information storage 103, and the communication management portion 107 to carry out on demand processing for the packages 109 in accordance with a command given from the external portion and to send results of the on demand processing back to the external portion.

In addition, the asynchronous event portion 106 is connected to the communication management portion 107, the address converter 108, the agent internal memory 102, and the event notifying portion 105 to process an asynchronous notification sent from the packages 109 through the communication management portion 107. The event notifying portion 105 is connected to the polling processing portion 104 and the asynchronous event processing portion 106 to notify an event reception portion (not shown) of an event which is notified from the polling processing portion 104 and the asynchronous event portion 106 and which is converted into a command of the agent 1.

Furthermore, the package information storage 103 is connected to the address converter 108, the on demand access processing portion 101, the communication management portion 107, and the polling processing portion 104 to store a wide variety of management information necessary for the polling processing to the packages 109, the on demand access processing, and the like. The address converter 108 is connected to the polling processing portion 104, the on demand processing portion 101, and the asynchronous event processing portion 106 to carry out address conversion in a manner to be described later in detail.

Like in the package internal memory 111 of each package 109, exclusive control to the agent internal memory 102 is executed before the agent internal memory 102 is accessed.

Figure 2:
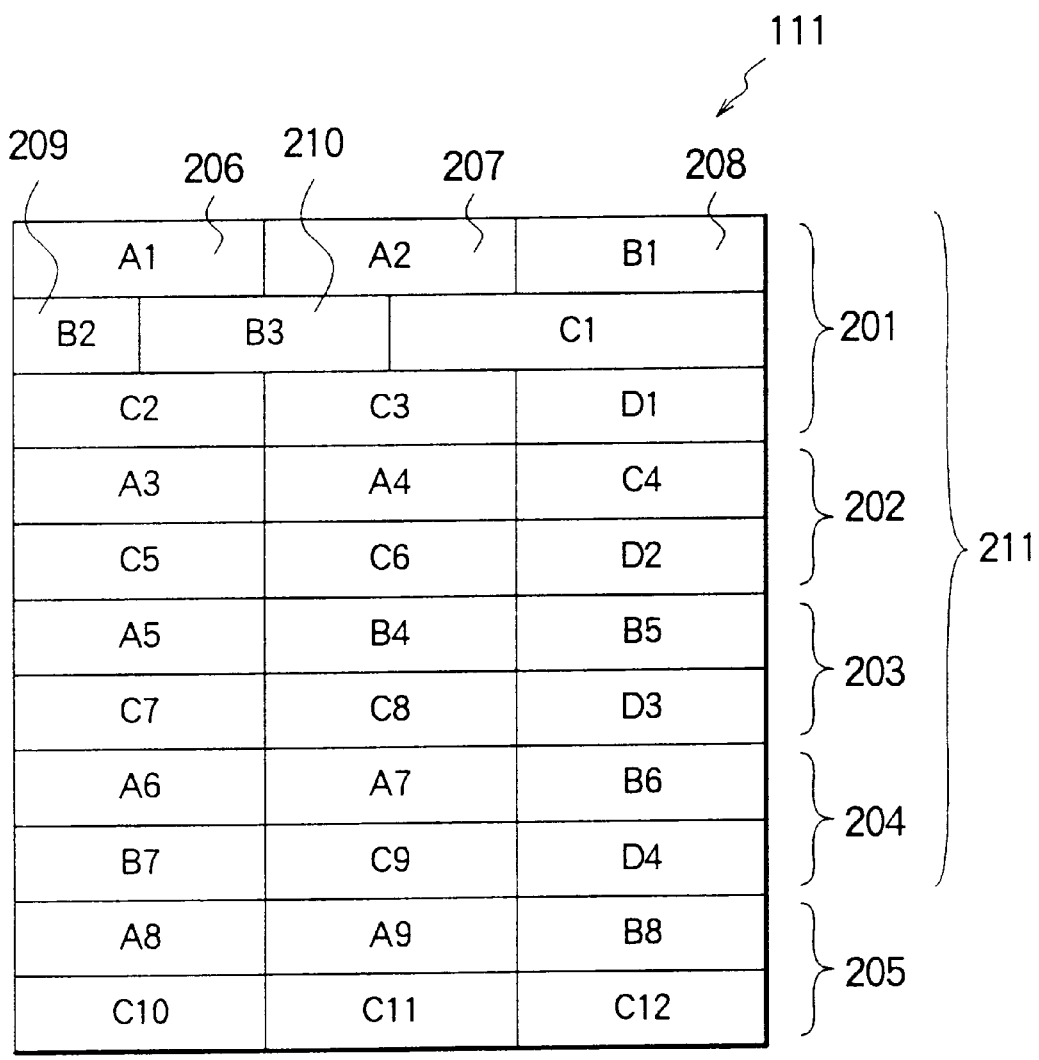
FIG. 2 shows an example of a data arrangement in a package internal memory.

Referring to FIG. 2, illustration is made about an arrangement of data signals which are stored in the package internal memory 111 of each package 109. In each of the packages 109, a copy of the data signals to be managed, namely, the managed data signals is stored in the package internal memory 111 which has the transfer area 211 and the non-transfer area 205, as mentioned before. The managed data signals are classified into groups each of which consists of a set of the managed data signals common to one another in a method of communicating with the agent 1 and processing the set of the managed data signals in the agent 1, as will be described later in detail. In the example being illustrated, each set of the managed data signals is consecutively arranged in the package internal memory 211, as shown in FIG. 2.

More specifically, the managed data signals to be managed are classified into first through fifth ones of the groups that will be described in detail hereinunder and that will be numbered from 1 to 5, respectively.

1. The first group of the managed data signals

The first group of the managed data signals specifies a data group which is obtained by the polling from the agent 1 and which is to be transcribed into the agent internal memory 102. As regards FIG. 2, the first group of the managed data signals is stored in a first zone of the transfer area 201 of the agent internal memory 111.

2. The second group of the managed data signals

The second group of the managed data signals consists of managed data signals which are obtained by the polling from the agent 1 and which are compared with previous values transcribed into the agent internal memory 102. The second group of the managed data signals are stored in a second zone of the transfer area 211 shown in FIG. 2.

3. The third group of the managed data signals

The third group of the managed data signals consists of managed data signals which are given by the polling carried out by the agent 1 and which are compared with predetermined threshold values to execute cross detection in relation to the predetermined threshold values. In FIG. 2, the third group of the managed data signals are stored in a zone 203 of the transfer area 211.

4. The fourth group of the managed data signals

The fourth group of the managed data signals consists of managed data signals which are asynchronously transferred to the agent 1 from the package 109. In FIG. 2, the fourth group of the managed data signals is stored in a zone 204 of the transfer area 111.

5. The fifth group of the managed data signals

The fifth group of the managed data signals consists of managed data signals which are accessed by the agent 1 and which are however given no corresponding storage area in the agent internal memory 102. In FIG. 2, the fifth group of the managed data signals is stored in a zone 205 of the package internal memory 111.

The zones 201 to 205 which correspond to the first through the fifth groups are arranged in the package internal memory 111 so that attributes of management object instances become consecutive in each group. Specifically, the management object instances are assumed to be composed of A, B, C, and D in the illustrated example. The attributes of the management object instance A are specified by A1, A2, A3, A4, A5, A6, A7, A8, and A9. In the attributes A1 to A9, let the attributes A1 and A2 be represented by the managed data signals which belong to the first group. The managed data signals which have the attributes A1 and A2 are consecutively or continuously arranged in the zone 201, as indicated by reference numerals 206 and 207. Likewise, when the management object instance B is specified by attributes B1, B2, and B3 which belong to the first group, the managed data signals which are representative of the attributes B1, B2, and B3 are consecutively arranged in the zone 201, as depicted at reference numbers 208, 209, and 210 in FIG. 2(A).

Figure 3:
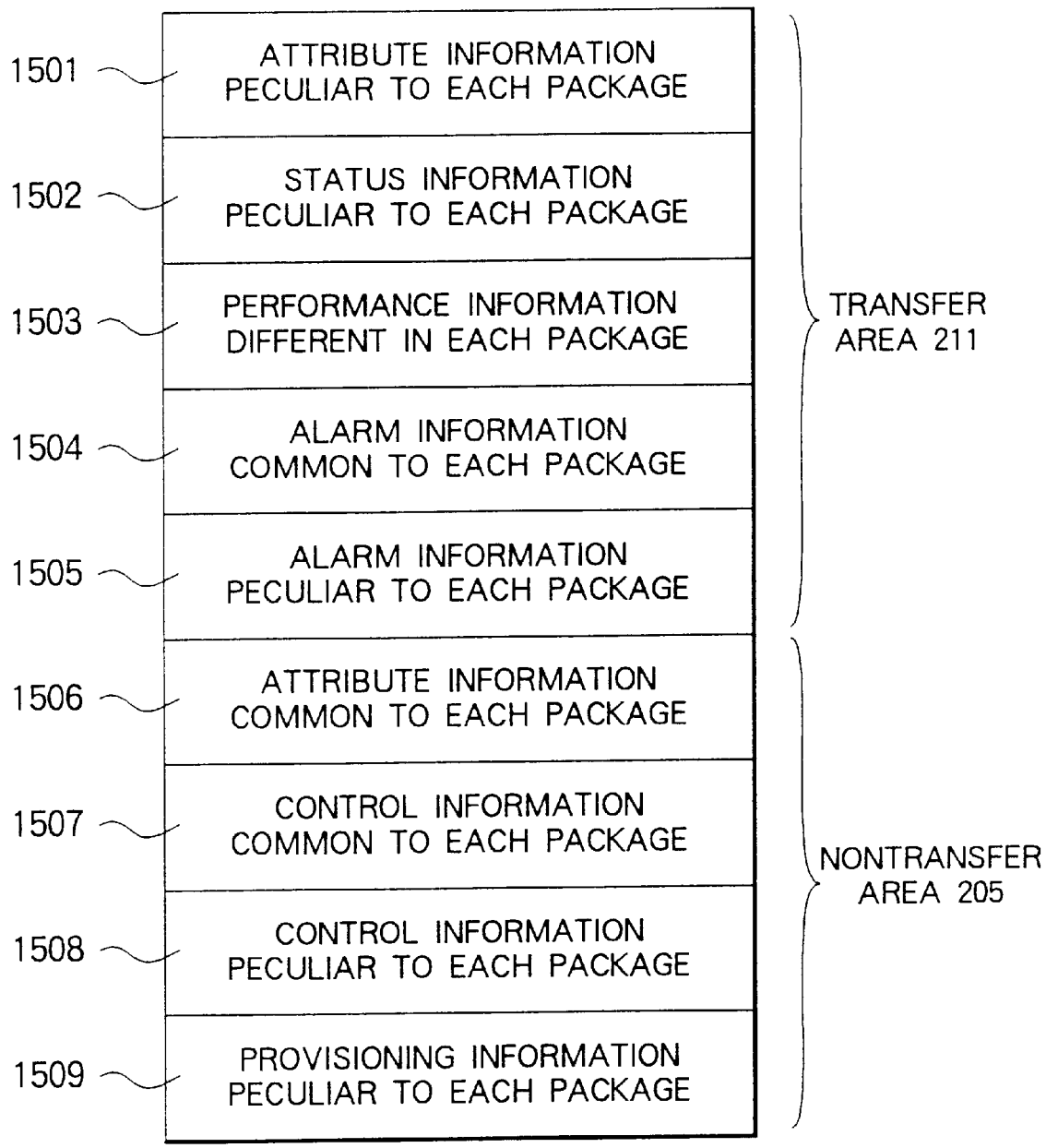
FIG. 3 shows an example of managed data signals stored in the package internal memory.

Referring to FIG. 3, description will be directed to the managed data signals which are stored in the package internal memory 111 shown in FIG. 1. In the illustrated example, the managed data signals are divided into nine species which will be enumerated hereinunder.

A first one of the managed data signals is representative of attribute information 1501 different from one another in each package 109 and may be, for example, end point information and the like.

A second one of the managed data signals is representative of status information 1502 peculiar to each package and may be, for example, operation status information and the like.

A third one of the managed data signals is representative of performance information 1503 determined or different in each package and may be, for example, an error rate and so on.

A fourth one of the managed data signals is representative of alarm information 1504 common to each package and may be, for example, fault information of each package.

A fifth one of the managed data signals is representative of alarm information 1505 peculiar to each package and may be, for example, communication interruption information and so on.

A sixth one of the managed data signals is representative of attribute information 1506 common to each package and may be, for example, package configuration information and the like.

A seventh one of the managed data signals is representative of control information 1507 common to each package and may be, for example, package protection information and so forth.

An eighth one of the managed data signals is representative of control information 1508 peculiar to each package and may be, for example, line protection information and the like.

A ninth one of the managed data signals to be managed is representative of provisioning information peculiar to each package and may be, for example, initialization information of each package.

Herein, it is to be noted in connection with the first through the ninth managed data signals that the attribute information 1501 may be classified into information which is obatained by the polling from the agent 1 and which is transcribed into the agent internal memory 102 as it is and that the status information 1502 is classified into information which is attained by the polling from the agent 1 and which is compared with the previous values kept in the agent information memory 102.

In addition, the performance information 1503 is classified into information which is obtained by the polling from the agent 1 and which is compared with the predetermined threshold values. Each alarm information 1504 and 1505 is classified into information which is for asynchronously making a notification to the agent 1 from each package 109. Each of the attribute information 1506, the control information 1507 and 1508, and the provisioning information 1509 is classified into information which is not transmitted to the agent 1 as long as an access request is not issued from the agent 1.

This shows that the information 1501 to 1505 of the first through the fifth classes is stored in the transfer area 211 to be transferred to the agent internal memory 102 while the information 1506 to 1509 of the sixth through the ninth classes is stored in the nontransfer area 205 not to be transferred to the agent internal memory 102.

Figure 4:
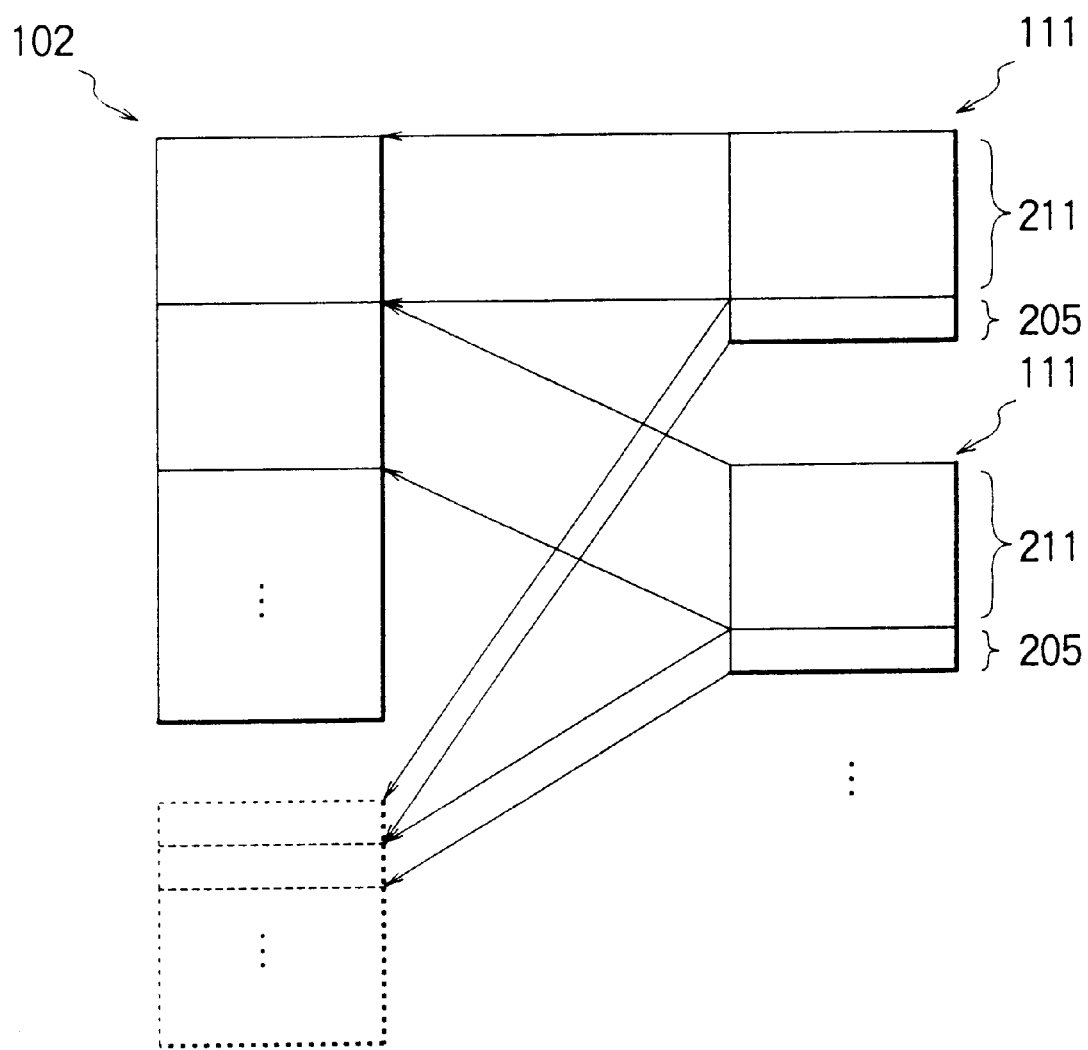
FIG. 4 shows a correspondence between the package internal memory and the agent internal memory.

Referring to FIG. 4, illustration is made about a correspondence of addresses between the agent internal memory 102 and the package internal memory 111. As shown in FIG. 4, the agent internal memory 102 has a plurality of memory areas which correspond to the transfer areas 211 of the package internal areas 111 of the respective packages 109 and which are continuously arranged one another without any gap. The memory areas serve to store the managed data signals transferred or transcribed from the transfer areas 211.

In addition, the agent internal memory 102 has a virtual address space ON which is distinguished from a real address of the agent internal memory 102 and which may be called a distinguished address space.

The virtual address space ON has virtual memory areas which correspond to the nontransfer areas 205 of the package internal memories 111 and which are continuously arranged in the virtual address space ON.

Figure 5:
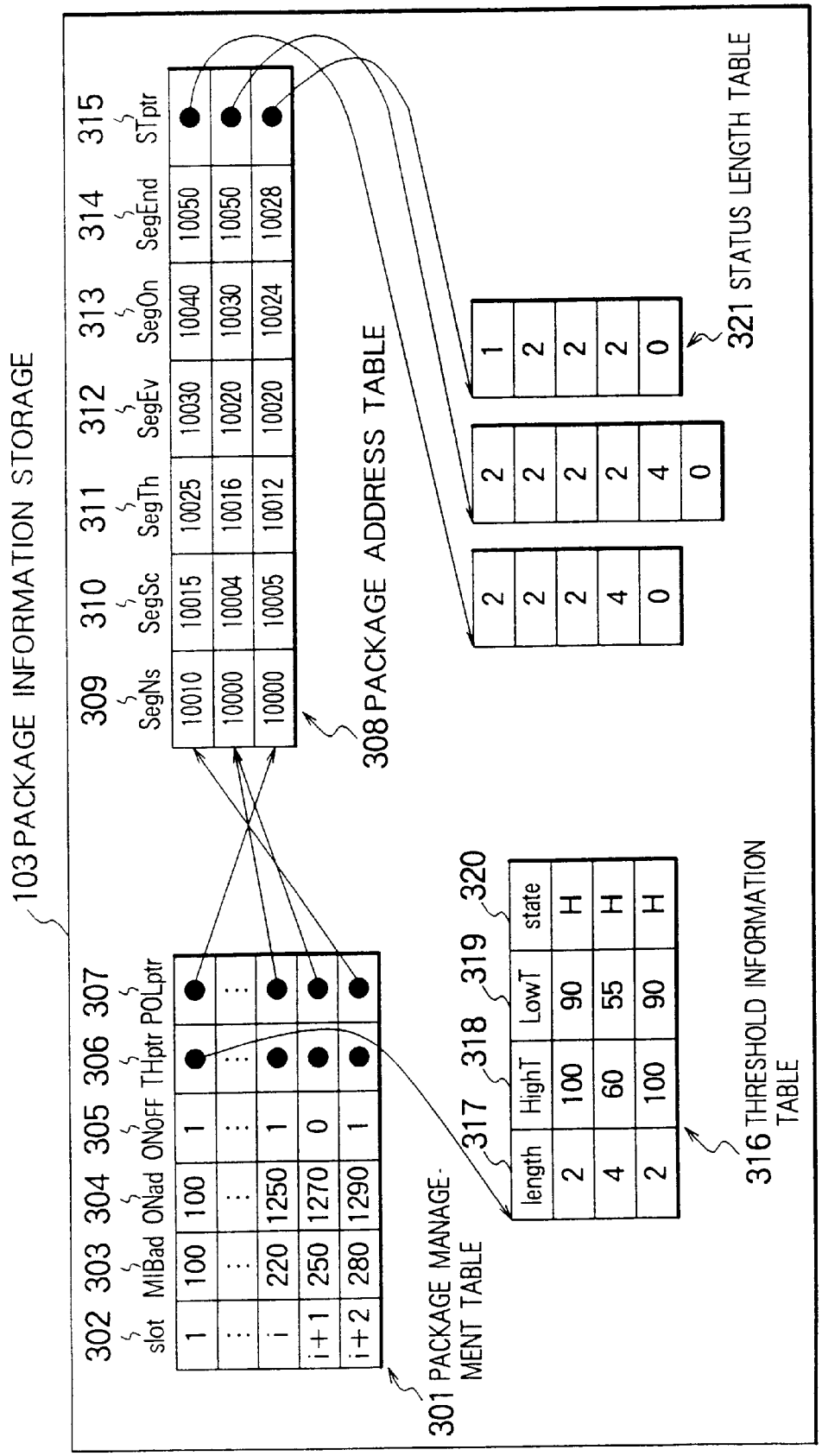
FIG. 5 is for use in describing operation of a package information storage included in an agent.

Referring to FIG. 5, the package information storage 103 included in the agent 1 illustrated in FIG. 1 stores a package management table 301, a package address table 308, a threshold information table 316, and a status length table 321.

Description will be made about each table in detail hereinuder.

At first, the package management table 301 serves as a base table of the other tables stored in the package information storage 103 and has a plurality of rows and a plurality of columns, as illustrated in FIG. 5. Each of the rows in the package management table 301 corresponds to a single one of the packages 109 managed by the agent 1 and is composed of six columns which specify elements as will be mentioned later.

More particularly, a first one of the elements or the columns represents a slot number which is assigned to a slot for accommodating each package 109 in the housing or case and which is indicated as "slot 302" in FIG. 5. The slot number will be referred to as a package number. A second one of the elements or columns represents a leading address of the agent internal memory 102 that corresponds to a leading address of the transfer area 211 of the package internal memory 111 in each package 109. The leading address of the agent internal memory 102 serves as a management information base address and is therefore abbreviated to an "MIBad 303" in FIG. 5.

A third one of the elements or the columns represents a virtual address of the agent internal memory 102 which corresponds to a leading address of the nontransfer area 205 in the package internal memory 111 and which is designated by "ONad 304" in FIG. 304. Furthermore, a fourth one of the-elements or the columns represents a polling flag which is representative of whether or not the polling can be executed in connection with the package to be polled and which is designated by "ONOFF 305" in FIG. 5. A fifth one of the elements or the columns is indicative of a pointer to the threshold information table 316 and is denoted by "THptr". Finally, a sixth one of the elements or the columns represents a pointer which indicates a corresponding row of the package address table 308 and which is denoted by "POLptr 307" in FIG. 5.

In FIG. 5, the package address table 308 has a plurality of rows and a plurality of columns. In the illustrated example, each of the rows corresponds to the same species of the packages and is composed of seven elements or columns which will be described in detail hereinunder. Herein, it is to be noted that each of the transfer and the nontransfer areas of the package internal memory 111 has a plurality of segments assigned to the respective zones 201 to 205.

A first one of the columns in the package address table 308 is indicative of a start address of the zone 201 of the package internal memory 111 and is designated by "SegNs 309" in FIG. 5. The name "SegNs 309" of the first column implies that no scanning operation is carried out in connection with the zone 201.

A second one of the columns in the package address table 308 is indicative of a start address of the zone 202 of the package internal-memory 111 and is designated by "SegSc 310" which means that a scanning operation is carried out in connection with the zone 202.

A third one of the columns in the package address table 308 is indicative of a start address of the zone 203 of the package internal memory 111 and is designated by "SegTh 311" which implies that the zone 203 is concerned with the predetermined threshold values.

A fourth one of the columns in the package address table 308 is indicative of a start address of the zone 204 of the package internal memory 111 and is designated by "SegEv 312" which implies that the zone 204 is concerned with events.

A fifth one of the columns in the package address table 308 is indicative of a start address of the nontransfer area 205 of the package internal memory 111 and is disignated by "SegOn 313".

A sixth one of the columns in the package address table 308 is indicative of an end address of the package internal memory 111 and is designated by "SegEnd 314".

A seventh one of the columns in the package address table 308 is indicative of a pointer to the status length table 321 and is specified by "STptr 315".

Among them, the start address "SegNc 309" also serves to indicate a leading address of the transfer area 211 for storing information to be transferred to the agent internal memory 102 from the package internal memory 111.

In FIG. 5, the threshold-information table 316 keeps threshold information related to data signals which are memorized in the zone 203 and to which threshold inspection or detection is executed. The threshold information table 316 is prepared for each package 109 and has a plurality of rows and a plurality of columns. Each row is composed of four items arranged in columns, respectively, and corresponds to a single one of the data signals to be managed and to be compared with threshold values.

Specifically, a first one of the items is representative of a data length specified by "length 317" while a second one of the items is representative of a high threshold value designated by "HighT 318" in FIG. 5 and a third one of the items is representative of a low threshold value 319 designated by "LowT 319" in FIG. 5.

In addition, a fourth one of the columns represents whether data are greater or smaller than threshold values and is specified by "state 320" in FIG. 5. In other words, the state 320 indicates a previous result of comparison between the data and each threshold value.

As illustrated in the threshold information table 316, the high and the low threshold values are present, which shows the threshold values exhibit a hysteresis. Specifically, when a previous state is greater or higher than the threshold value, the state 320 exhibits a "high" state. In this case, the following or current threshold detection is carried out by the use of the low threshold value "LowT 319". On the other hand, when a previous state is not greater than the threshold value and the state 320 exhibits a "low" state, current threshold detection is carried out by the use of the high threshold value "HighT 318".

The status length table 321 stores length information of the data signals which are stored in the package internal memory 111 and which are to be inspected as regards presence or absence of a change of status. The status length table 321 is prepared at every one of the species of the packages 109. Thus, the length information represents a data length to be inspected in question. In this connection, the status length table 321 successively stores data lengths from a leading data length of a leading managed data signal to be detected in the status change. A last one of the managed data signals has a data length equal to zero, as illustrated in the status length table 321.

Referring back to FIG. 1, the address converter 108 carries out address conversion in a manner to be described with reference to the package management table 301 and the package address table both of which are stored in the package information storage 103 (FIG. 5). Such address conversion is divided into two operations which will be described below.

(1) A first one of the operations is for converting a package number and an address of the package internal memory 111 into an address of the agent internal memory 102.

(2) A second one of the operations is for inversely converting an address of the agent internal memory 102 into a package number and an address of the package internal memory 111.

Herein, each of the first and the second operations will be described in detail.

Figure 6:
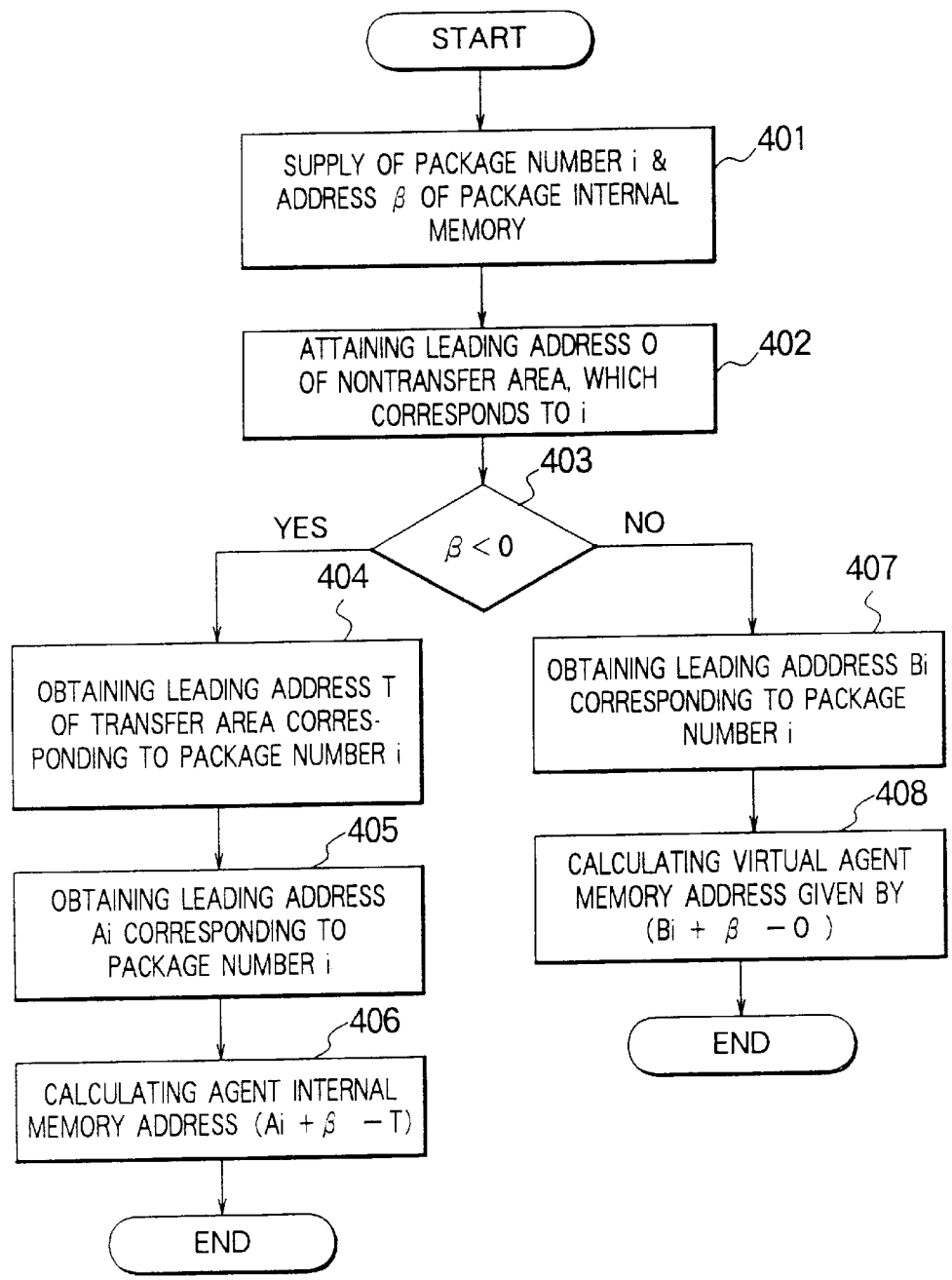
FIG. 6 is a flow chart for use in describing an address conversion operation from a package number and a package internal memory address to an agent internal memory address.

On the first operation, the package number and the address of the package internal memory 111 are converted by the address converter 108 into the address of the agent internal memory 102 in a manner to be mentioned in accordance with a conversion procedure illustrated in FIG. 6.

Referring to FIG. 6, the address converter 108 is supplied with a package number (dipicted at i) and a package internal address (depicted at β) from a request source which requests the address conversion (step 401) when the first operation is started. The address converter 108 accesses the package information storage 103 to detect the package management table 301 (FIG. 5) and to watch the slot 302 and to search for the row of the number i in the package management table 301. Thereafter, the package address table 308 is accessed by the pointer POLptr arranged in the row i of the package management table 301. As a result, a row of the package address table 308 which corresponds to the row i of the package management table 301 is accessed by the pointer POLptr to detect the column SegOn 313 of the corresponding row in the package address table 308. From this column SegOn 313 along the corresponding row, extraction is made about a start or a leading address (depicted at O) of the nontransfer area 205 in the package internal memory 111 (step 402).

Subsequently, the package internal address β of the package internal memory 111 is compared with the leading address O of the nontransfer area 205 (step 403) so as to judge whether the package internal address β falls within the transfer area 211 of the package internal memory 111 or outside of the nontransfer area 205. Since the illustrated package internal addresses in the package internal memory 111 are consecutively numbered in an ascending order from the transfer area 211 to the nontransfer area 205, the package internal address β is smaller than the leading address O of the nontransfer area 205 when the transfer area 211 of the package internal memory 111 is specified by the package internal address β. On the other hand, the package internal address β is equal to or greater than the leading address O of the nontransfer area 205 when the nontransfer area 205 of the package internal memory 111 is specified by the package internal address β.

Taking the above into consideration, when the package internal address β is smaller than the leading address O of the nontransfer area 205, the address converter 108 judges at the step-403 that the package internal address β falls within the transfer area 211 of the package internal memory 111. Thereafter, the step 403 is thereafter followed by a step 404. At the step 404, the address converter 108 obtains the leading address (depicted at T) of the transfer area 211 of the package internal memory 111 with reference to the column SegNs 309 located in the row of the packge address table 308 under consideration. Briefly, the leading address T of the transfer area 211 in the package 109 which corresponds to the package number i is obtained from the package address table 308 at the step 404.

Thereafter, the column MIBad 303 of the package management table 301 is searched to detect a leading address Ai of the agent internal memory 102 which corresponds to the leading address T of the transfer area 211 of the package internal memory 111 (step 405). Thus, the leading address T specifies a leading position of the transfer area 211 in the package internal memory 111 and corresponds to the leading address Ai of the agent internal memory 102. From this fact, it is readily understood that the agent internal memory address which corresponds to the package internal memory address β is given by (Ai+β−T) as a converted memory address. The converted memory address is returned back to the request source (step 406).

On the other hand, when β is equal to or greater than the leading address O of the transfer area 211, the package memory address β given from the request source falls within the nontransfer area 205. Therefore, the address converter 108 accesses the package management table 301 to search for the column ONad 304 arranged in the row corresponding to the package number i and to extract the leading address Bi corresponding to the transfer area 205 (step 407). This shows that a virtual address in the agent internal memory 102 is obtained as the leading address Bi and correponds to a leading address of the nontransfer area 205 of the package internal memory 111.

As mentioned before, the leading address O is a leading address of the nontransfer area 205 in the package internal memory 111 included in the package i. This means that no address which corresponds to the leading address O is present in the agent internal memory 102. However, the virtual memory address space ON is prepared in the agent internal memory 102, as described in conjunction with FIG. 4. The resultant virtual address Bi corresponds to the leading address O of the nontransfer area 211 in the package internal memory 111.

Under the circumstances, the address converter 108 calculates the agent internal memory address in accordance with a formula given by Bi+β−O which is returned back to the request source. At any rate, the agent internal memory address corresponds to the package internal memory address β.

For example, let a package number i and an input package internal memory address "10022" be given to be converted into an agent internal memory address on assumption that the package information storage 103 stores the contents illustrated in FIG. 5. In this event, the address converter 108 at first searches for the column "slot 302" in the package management table 301 to detect the row i assigned to the package number i. Thereafter, the pointer "POLptr 307" in the row i is retrieved by the address converter 108 to extract the package address table 308. The illustrated pointer "POLptr 307" in the i-th row points the second row of the package address table 308 and the column "SegOn 313" in the second row is accessed by the pointer "POLptr 307". In the example illustrated in FIG. 5, the content of the column "Segon 313" in the second row is specified by "10030".

Next, the input package internal memory address "10022" is compared with the content of "10030" by the address converter 108. In this example, since the input package internal memory address "10022" is smaller than the content of "10030", the address converter 108 judges that the input package internal memory address falls within the transfer area 211 of the package internal memory 111. Subsequently, the package address table 308 is accessed to obtain an address of "10000" from the column "SegNs 309" to extract the leading address of the transfer area 211 in the package internal memory 111. From these data Ai, β, and T, such as 220, 10022, and 10000, the address converter 108-carries out calculation of "220+10020−10000" and obtains "242".

Figure 7:
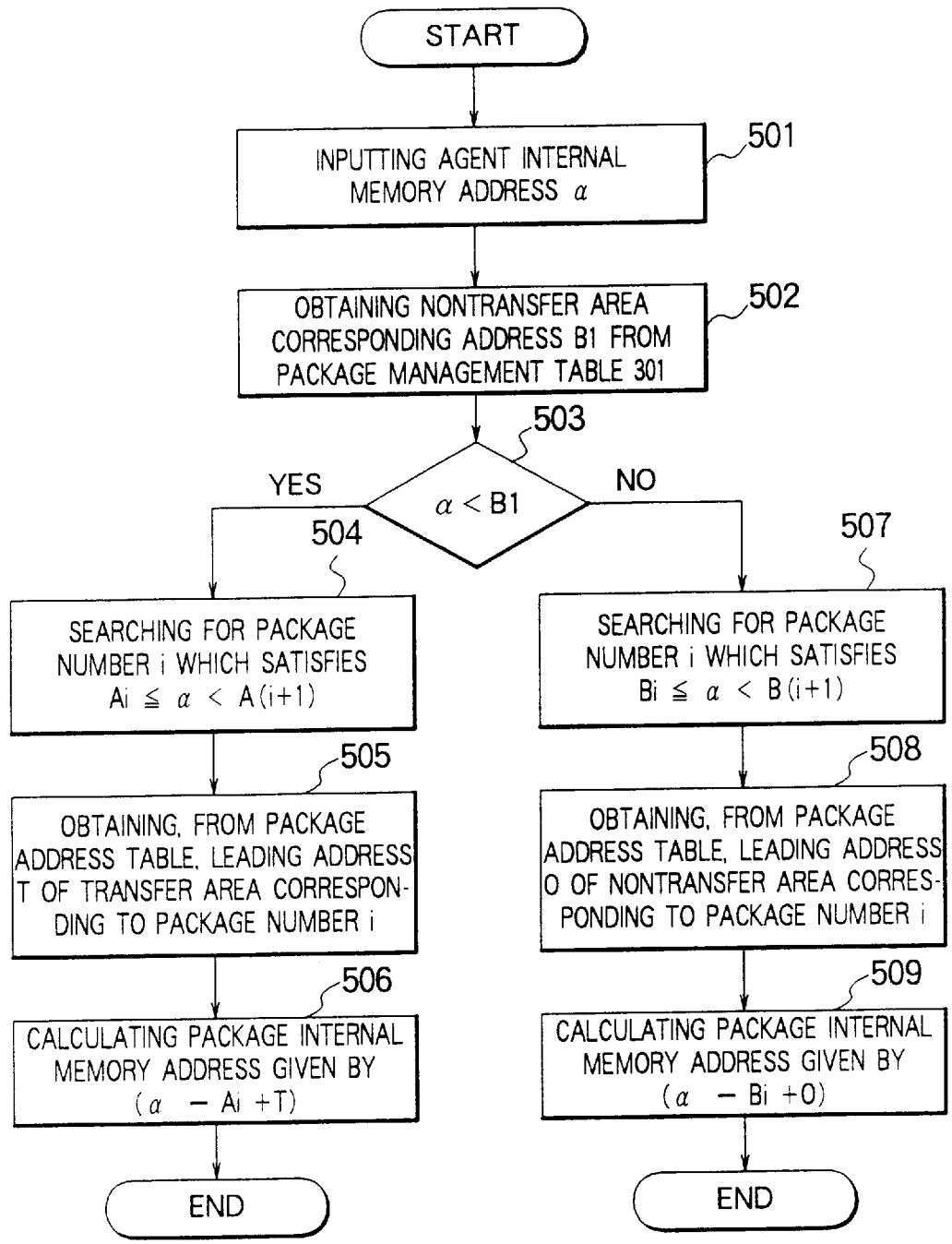
FIG. 7 is a flow chart for use in describing an address conversion from an agent internal memory address to the package number and the package internal memory address.

Referring to FIG. 7, the conversion procedure will be described which is carried out to convert an agent internal memory address of the agent internal memory 102 into a package number and a package internal memory address of the package internal memory 111. In FIG. 7, the address converter 108 is given an agent internal memory address (depicted at α) from a request source of requesting address conversion (step 501). In the address converter 108, judgement is made about whether the agent internal memory address α corresponds to the transfer area 211 of the package internal memory 111 or the nontransfer area 205 of the package internal memory 111. To this end, the package management table 301 is accessed to detect a nontransfer area corresponding address B1 from the column "ONad 304" along the row of the package number 1. In other words, the virtual address BI in the agent internal memory 102 is obtained which corresponds to a leading address of the nontransfer area 205 in the package internal memory 111 (step 502). The virtual address B1 is compared with the agent internal memory address α (step 503). Thus, the nontransfer area corresponding address B1 of the package number 1 is compared with the agent internal memory address α. This is because the nontransfer area 205 which is assigned to the package of the package number 1 is made to correspond to the smallest virtual address (see the numerical value in the ONad 304 of the package management table 301 in FIG. 5).

As a result of comparison, when α<B1, the agent internal memory address α corresponds to either one zone of the transfer area 211 in the package internal memory 111. In this event, the following procedure will be executed. At first, the address converter 108 retrieves the transfer area corresponding address "MIBad 303" from the first row of the package management table 301. The number i is searched such that Ai≦α<A(i+1) holds (A represents a value of MIBad obtained by retrieval) and, as a result, the package number i is determined (step 504).

Subsequently, the row which corresponds to the package number i is retrieved to extract the pointer "POLptr 307" from the row in question. The illustrated pointer "POLptr 307" points out the second row of the package address table 308 to obtain the leading address T of the transfer area 211 from the column "SegNs 309" (step 505). In the exmaple being illustrated, it is assumed that the agent internal memory address Ai of the agent internal memory 102 corresponds to the package internal memory address T of the package (i). Therefore, the package internal memory address corresponding to the address α is given by α−Ai+T, where Ai is representative of a transfer area corresponding address Ai determined in relation to the package (i) in the agent internal memory 102. Thus, the package internal memory address is specified by adding T to a difference between the address α and the transfer area corresponding address Ai. In any event, the package internal memory address is calculated by (α−Ai+T) and is returned back to the request source (step 506).

On the other hand, when α≦B1, the agent internal memory address α corresponds to the nontransfer area 205 in the package internal memory 111. In this case, the following operation will be executed in the address converter 108. The address converter 108 accesses the package management table 301 to retrieve the nontransfer area corresponding address ONad from the leading row of the package management table 301 and to search for i which satisfies a relationship between Bi≦α<B(i+1), where B is representative of a value obtained from the address converter 108 and the package number is attained (step 507).

Next, the pointer POLptr is detected from the row of the package number i to access a row of the package address table 308 which is indicated by the pointer POLptr. From the row of the package address table 308, the column SegOn 313 is detected to a leading address O of the nontransfer area 205 (step 508). Thus, the agent internal virtual address Bi corresponds to the package internal memory address O of the package i. This shows that the package internal memory address which corresponds to the agent internal memory address a can be calculated by adding O to an address difference between the nontransfer area corresponding address Bi in the agent 1 and the agent internal memory address α and is therefore given by α−Bi+O (step 509).

For example, let the agent internal memory address "1271" which is given as an input address be converted into a package number and a package internal memory address on the assumption that the the package intormation storage 103 stores the contents illustrated in FIG. 5. In this event, the address converter 108 searches for the package management table 301 to retrieve a first one of the rows thereof, to retrieve the nontransfer area corresponding address ONad 304 from the first row of the package management table 301, and to obtain the address "1000" as an stored address. Thereafter, the address converter 108 compares the input address "1271" with the stored address "1000" to detect that the input address "1271" is greater than the stored address "1000". As a result, the address converter 108 judges that the input address "1271" falls within the nontransfer area 205 and retrieves the nontransfer area corresponding address ONad 304 in the package management table 301. In FIG. 5, the input address "1271" is greater than "1270" in the row of the package number (i+1) while the input address "1271" is smaller than "1290" in the row of the package number (i+2). Under the circumstances, the address converter 108 determines the package number to be (i+1) and reads out the pointer POLptr 307 of the row (i+1). Since the POLptr indicates a second row of the package address table 308, as illustrated in FIG. 5, the address converter 108 accesses the column SegOn 313 which specifies the nontransfer area start address of the package, to obtain "10030". The address converter 108 calculates "1271−1270+10030" to obtain "10031" as the package internal memory address.

Turning back to FIG. 1, description will be made about polling processing which is executed by the agent 1 to the packages 109. Practically, the polling processing is carried out by the polling processing portion 104 which includes an internal timer periodically energized. When the internal timer is energized and a polling object address is given from the package information storage 103, the polling processing portion 104 obtains the managed data signals through the communication management portion 107 from the package 109 indicated by the polling object address. Thereafter, the managed data signals are transcribed to the agent internal memory 102. In addition, the polling processing portion 104 carries out comparison of the managed data signals with previous data values stored in the agent internal memory 102 and threshold crossing detection in a manner to be described. On detection of a change of values and threshold crossing, the polling processing portion 104 informs the event notifying portion 105 of the above-mentioned detection.

Figure 8:
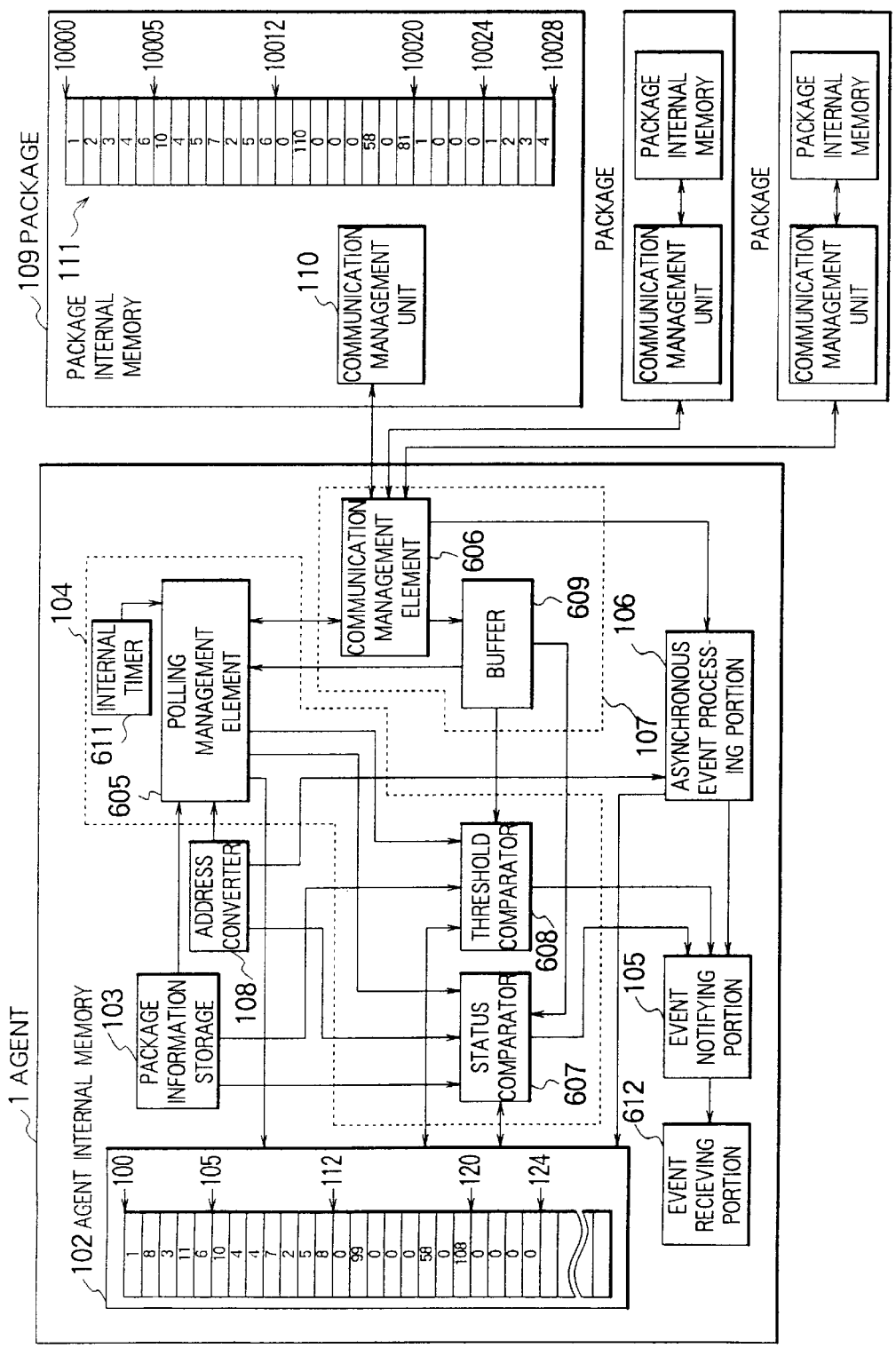
FIG. 8 shows a block diagram for use in describing the network system illustrated in FIG. 1 in detail.

Referring to FIG. 8 together with FIGS. 1 and 5, the polling processing will be described more in detail. It is to be noted in FIG. 8 that-address numbers and specific contents are attached to the package internal memory 111 and the agent internal memory 102. As shown in FIG. 8, the polling processing portion 104 depicted at a broken line block comprises an internal timer 611, a polling management element 605, a status comparator 607, and a threshold comparator 608. With this structure, the polling management element 605 is periodically energized by the internal timer 611 and refers to the polling ONOFF flags 305 which correspond to all of the packages 109 and which are stored in the package management table 301 in the package information storage 103. The polling ONOFF flags 305 are indicative of whether or not each of the packages can be polled. Thereafter, the polling management element 605 successively executes polling operations of the package internal memories 111 at every one of the packages that has the flag of non-zero.

Herein, it is assumed that the ONOFF flag 305 of "1" is assigned to the package of the package number 1 and that the package of the package number 1 is subjected to the polling processing as an example of polling.

At first, the polling management unit 605 accesses the package management table 301 of the package information storage 103 to detect the pointer POLptr 307 from the row of the package management table 301 which corresponds to the package number 1. In this case, the package address table 308 is indicated by the use of the pointer POLptr to specify the row of the package address table 308 which is pointed by the pointer POLptr. Thus, SegNs 309 and SegEv 312 are extracted from the row of the package address table 308. As a result, the polling management element 605 determines a polling area which is defined by addresses stored by the SegNs309 and the SegEv. Specifically, the polling area is defined between the address indicated by the SegNs and the address which is smaller by one than the address specified by the SegEv. In the example being illustrated, an area between the package internal memory addresses "10000" and "10019" is determined as the polling area. The polling area includes the first, the second, and the third zones 201, 202, and 203 illustrated in FIG. 2. Herein, it should be recollected that the first zone 201 is used for direct transcription operation while the second the third zones 202 and 203 are used for comparison and judgement of threshold crossing detection, respectively.

In the illustrated example, the polling management element 605 transmits the package number 1 to be polled and the polling area to the communication management unit 107. The polling area may be defined either by a polling start address and a length of the polling area or by a polling start address and a polling end address.

As shown in FIG. 8, the communication management portion 107 has a communication management element 606 and a buffer 609. The illustrated communication element 606 is given the package number 1 and converts the package number 1 into a logical communication address sent through the transmission path 112 to each package 109. Such a logical communication address indicated serves to inform the communication management unit 110 of the package 109 of the polling area. The communication management unit 110 may be called a package communication management unit or portion.

The package communication management unit 110 of the package 109 to be polled extracts the managed data signals stored in the polling area of the package internal memory 111 that is indicated by the agent 1. Thereafter, the managed data signals are transmitted to the agent 1.

Supplied with the managed data signals, the communication management element 606 of the agent 1 stores the managed data signals into the buffer 609 and informs the polling management unit 605 that the managed data signals are acquired from the package of the package number 1.

Thereafter, the polling management element 605 carries out three processings which are composed of direct transcription processing, comparison processing, and threshold crossing processing.

Each processing executed in the polling management element 604 will be described more in detail.

(1) Direct transcription processing:

The polling management element 605 acquires the stored addresses of SegNs 309 and SegSc 310 arranged in the row assigned to the package which is now being polled. Thereafter, the polling management element 605 calculates, from (SegSc−SegNs), a data length of the zone 201 to be directly transcribed. Subsequently, the polling management element 605 informs the address converter 108 of the package number 1 currently polled and the stored address of (SegNs) and acquires corresponding addresses of the agent internal memory 102. Under the circumstances, the managed data signals are successively transcribed from a leading address of the buffer 609 to corresponding addresses of the agent internal memory 102.

In the example illustrated in FIG. 5, the package number 1 of the package 109 is specified by the SegSc of "10005" and the SegNs of "10000" in the package address table 308. This means that the data length to be transcribed is given by (10005−10000) and is equal to "5". On the other hand, the result of address conversion sent back from the address converter 108 is equal to "100". Therefore, the managed data signals stored in the zone of the buffer 609 from the address "0" to the address "4" are transcribed to the corresponding zone of the agent internal memory 102 to which the addresses "100" to "104" are assigned.

(2) Comparison processing:

Next, the polling management element 605 refers to the package address table 308 to extract, from the package address table 308, the pointer STptr 315 which is arranged in the row corresponding to the package currently polled and which points out or indicates the status length table 321. In other words, a leading address of the status length table 321 is obtained which stores a data length of each managed data signal which is required on comparison of a change of status. Thereafter, managed data signals stored in the agent internal memory 102 are compared with those of the buffer 609. To this end, the polling management element 605 transmits, to the status comparator 607, SegNs 309 and SegSc 310 which are concerned with the leading address of the status length table 321 and the package polled.

Herein, the status comparator 607 successively reads the status length table 321 from a leading address and compares contents of the buffer 609 with contents of the agent internal memory 102. Such comparison is repeated for each of data lengths indicated in each row of the status length table 321 and finished until a data signal of "0" is acquired from the status length table 321.

When the contents of the buffer 609 do not coincide with the contents of the agent internal memory 102, the status comparator 607 writes the contents or data signals obtained from the buffer 609 into corresponding addresses of the agent internal memory 102 and notifies the event notification portion 105 of addresses of the agent internal memory 102 compared and values previously stored in the addresses in question before the write-in operation.

Thus, notification is made about the previous values stored in the addresses before the write-in operation. This is because the previous values are extinct by the write-in operation, although post values after the write-in operation are stored and left in the agent internal memory 102.

Such status comparison will be described in connection with the package 109 of the package number 1 with reference to FIG. 5. In FIG. 5, it is readily understood that the row assigned to the package number 1 has "10000" and "10005" as SegNs 309 and SegSc, respectively, in the package address table 308. Since the SegNs corresponds to the address number "0" of the buffer 609, the content of the SegSc 310 corresponds to a buffer address "5" which serves as a leading address for detecting a change of status.

Specifically, the status comparator 607 reads every one of the rows from the status length table 321 corresponding to the status comparator 607 and carries out the comparison processing.

In FIG. 5, the righthand side one of the status length tables 321 is indicated by the pointer STptr stored in the third row of the package address table 308. As a result, a first one of the rows is accessed in the status length table 321 under consideration and stores 1 as the data length. The status comparator 607 is given the contents or managed data signals of the data length 1 from both the buffer 609 and the-agent internal memory 102.

In this case, the managed data signal of the data length 1 is acquired from the leading address "5" which is obtained from the buffer 609 in the manner mentioned before. On the other hand, the address converter 108 is given the package number 1 and the package internal memory address "10005" from the agent internal memory 102 and converted into the agent internal memory address "105". Therefore, the managed data signal from the agent internal memory address "105" is read by a single data length.

In FIG. 8, the managed data signal of "10" is stored in the agent internal memory address "105". On the other hand, the buffer 609 stores the status detection data signal which is sent from the package internal memory address "10005" of the package internal memory 111 and which is located at a leading address of the buffer 609. The status detection data signal of a single data length is equal to "10".

From this fact, it is understood that the data signal in the agent internal memory address "105" is coincident with the status detection data signal stored in the buffer 609. Accordingly, the status comparator 607 issues no notification to the agent internal memory and the event notification portion 105.

In FIG. 2, a second one of the rows in the status length table 321 is read out of the package information storage 103 and is sent to the status comparator 607. The second row in the status length table 321 in question stores "2" as the data length. In this case, the managed data signals which have the data length of 2 are acquired from the buffer 609 and the agent internal memory 102. In the example illustrated, "4" and "4" are stored as the managed data signals in the agent internal memory addresses 106 and 107 of the agent internal memory 102, respectively. On the other hand, "4" and "5" are sent from the package internal addresses "10006" and "10007" and stored as the managed data signals in the following addresses of the buffer 609. Therefore, the data signals in the agent internal memory 102 do not coincide with the buffer 609. In this case, the status comparator 607 writes the data signals of "4" and "5" into the agent internal memory addresses 106 and 107 of the agent internal memory 102. In addition, the status comparator 607 notifies the event notification portion of the agent internal memory address "106" and the previous data signals "4" and "4" stored in the agent internal memory 102. Similar operation is carried out in connection with the remaining rows of the status length table 321.

(3) Threshold crossing detection processing:

Furthermore, the polling management element 605 carries out the threshold crossing detection processing in a manner to be described later in detail. At first, the polling management element 605 refers to the package address table 308 illustrated in FIG. 5 in consideration of the package which is currently polled.

Specifically, contents of SegNs 309 and SegTh 311 are sent to the polling management element 605 from the row of the package address table 308, which is assigned to the package currently polled. The polling management element 605 calculates a difference between the contents of SegNs 309 and SegTh 311 to detect an offset or displacement of the third zone 203 from the leading address in the package internal memory 111. The third zone 203 is used for detecting threshold crossing, as mentioned before.

In addition, the polling management element 605 refers to the threshold information table 316 stored in the package information storage 103 to attain a leading address which is arranged in the threshold information table 316 and which specifies the package currently polled. Such a leading address of the threshold information table 316 is obtained from the pointer THptr which is stored in the package management table 301 and which indicates the threshold information table 316. The threshold comparator 608 is supplied with the leading address which specifies the zone of the buffer 609 for threshold crossing detection.

The threshold comparator 608 accesses the threshold information table 316 pointed out by THptr and reads the contents of the table 316 at every row to carry out threshold crossing detection. Such an operation is continued by the threshold comparator 608 until the last row of the table 316 is completely processed.

Specifically, the threshold comparator 608 at first refers to a row of the threshold information table 316 and reads the data length 317 written into the row of the threshold information table 316. The threshold comparator 608 reads the managed data signals of a length indicated by the data length 317, out of the buffer 609.

In this event, when a first one of the rows in the threshold information table 316 is processed, a readout operation is carried out with reference to a leading address of a zone for storing the managed data signals which are stored from the polling management element 605 so as to execute threshold crossing detection. Otherwise, such readout operation is started from an address following a previous address which is subjected to processing before.

Now, when the state 320 of the row in the threshold information table 316 exhibits a high (H) state, the threshold comparator 608 compares the managed data signals of the same length read out of the buffer 609 with the low threshold level (LowT). To the contrary, when the state 320 of the row in the threshold information table 316 exhibits a low (L) state, the threshold comparator 608 compares the managed data signals with the high threshold level (HighT).

In consequence, when a current relationship is different from a previous relationship, the threshold comparator 608 notifies the event notification portion 105 of the agent internal memory address of the data signals compared by the threshold comparator 608, along with the current relationship. Further, the current relationship is set into the state 320 of the threshold information table in the threshold information table 316.

In FIG. 1 again, description will be made about an operation of the agent 1 which is carried out when asynchronous notification is sent from the package 109 to the agent 1. Such asynchronous notification is given from the package 109 to the communication management portion 107 of the agent 1. The communication management portion 107 delivers a content of the asynchronous notification to the asynchronous event processing portion 106 which obtains a corresponding agent internal memory address of the agent internal memory 102 by the use of the address converter 108. Data signals to be managed which are included in the content of the asynchronous notification are transcribed by the asynchronous event processing portion 106 into agent internal memory addresses of the agent internal memory 102. The asynchronous event processing portion 106 transmits the content of the asynchronous notification to the event notification portion 105.

Figure 9:
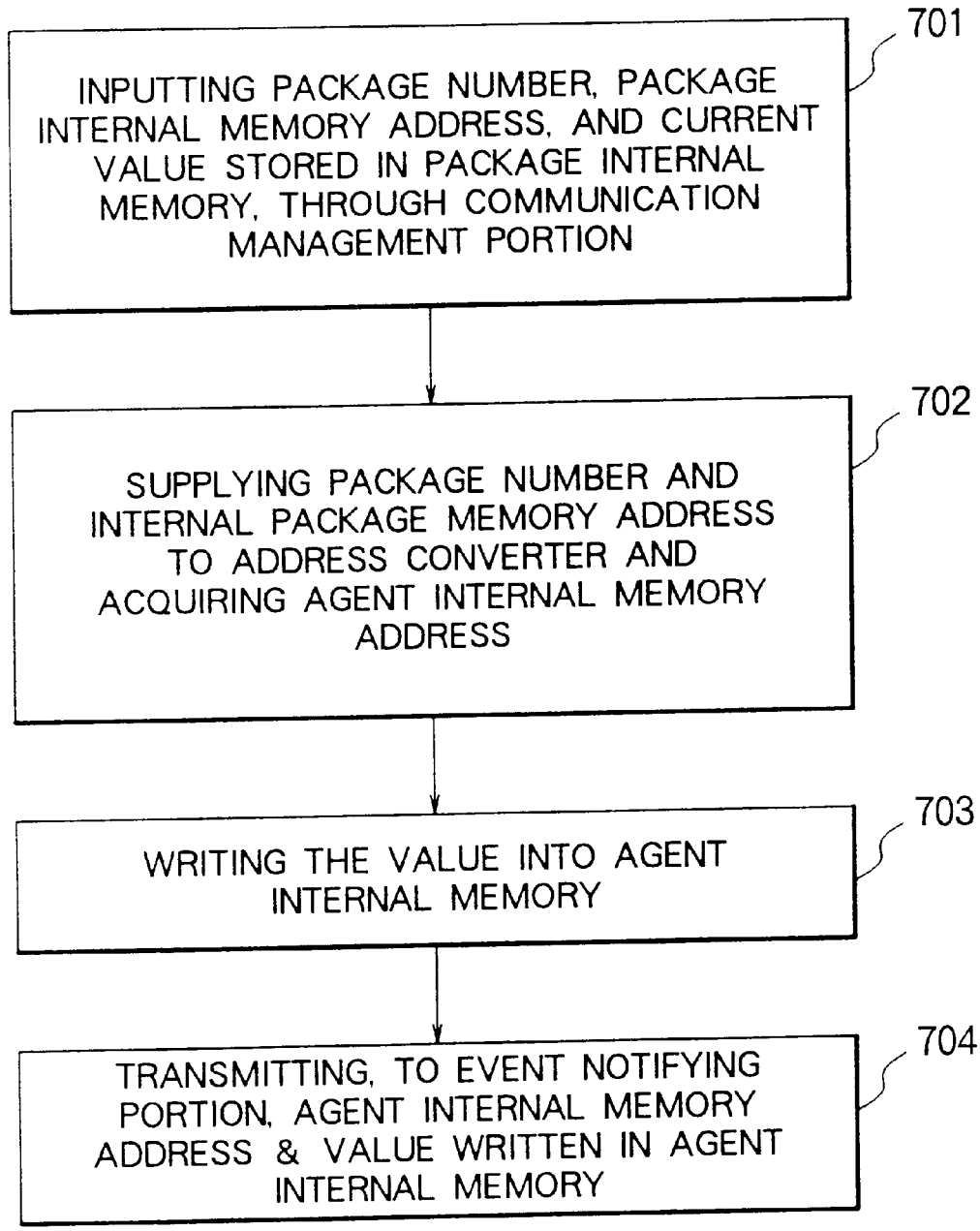
FIG. 9 is a flow chart for use in describing operation of an asynchronous processing portion included in FIG. 1.

Referring to FIG. 9 together FIG. 8, operation of the asynchronous event processing portion 106 will be described in detail. Herein, it is to be noted that, when an emergent event, such as an alarm occurs in each of the packages 109, such an emergent event should be quickly transmitted or notified from each of the packages 109 to the agent 1 and is preferably asynchronously transmitted to the agent 1 without waiting for polling. For this purpose, asynchronous notification is executed between the packages 109 and the agent 1. In the illustrated example, transfer operation is made from the communication management unit 110 of each package 109 to the communication management portion 107 of the agent i in order to specify such an emergent event. In this case, a package internal memory address of the package internal memory 111 which gives rise to the emergent event is transferred from each of the packages 109 to the agent 1, along with current values stored in the package internal memory address.

Supplied with the asynchronous notification from each of the packages 109 in which the emergent event occurs, the communication management portion 107 in the agent 1 transmits, to the asynchronous event processing portion 106, a package number of the package in question, the package internal memory address related to the emergent event caused to occur, and the current value of the package internal memory address.

In FIG. 9, the asynchronous event processing portion 106 is supplied with the package number sent from the communication management portion 107, a package internal memory address, and the current value stored in the package internal memory (step 701). Next, the asynchronous event processing portion 106 informs the address converter 108 of the package number and the package internal memory address and acquires a corresponding agent internal memory address from the address converter 108 (step 702). Subsequently, a value which is stored in the acquired agent internal memory address is read out of the agent internal memory 102 while the current value received through the communication management portion 107 is written into the corresponding agent internal memory address of the agent internal memory 102 (step 703). Thereafter, the asynchronous event processing portion 106 transmits the agent internal memory address written and the value written in the agent internal memory address to the event notification portion 105 (step 704).

The event notification portion 105 transmits both the contents to an event reception portion 612 which carries out asynchronous processing in the agent 1 on the basis of the contents transmitted. On such asynchronous processing, a message may be asynchronously transmitted to a manager (not shown) or occurrence of such asynchronous notification may be recorded in the agent 1.

Referring back to FIG. 1, description will be made about on demand access processing which is carried out from the agent 1 to the package 109. Practically, such on demand processing is executed in the on demand access processing portion 101 when an on demand request is sent from a manager (not shown) by the use of a command which designates a range-of processing, namely, a processing range. The on demand access processing portion 101 controls the address converter 108 so that the agent internal memory address within the processing range is converted by the address converter 108 into the corresponding package number and package internal memory address. Furthermore, the on demand access processing portion 101 transmits the processing range within the package internal memory through the communication management portion 107 to the package indicated by the package number. A set managed data signal is also transmitted from the on demand access processing portion 101 on setting the agent 1 and the packages 109.

At any rate, the on demand access processing portion 101 receives a return signal through the communication management portion 107 to return the same back to a request source, such as a manager.

Figure 10:
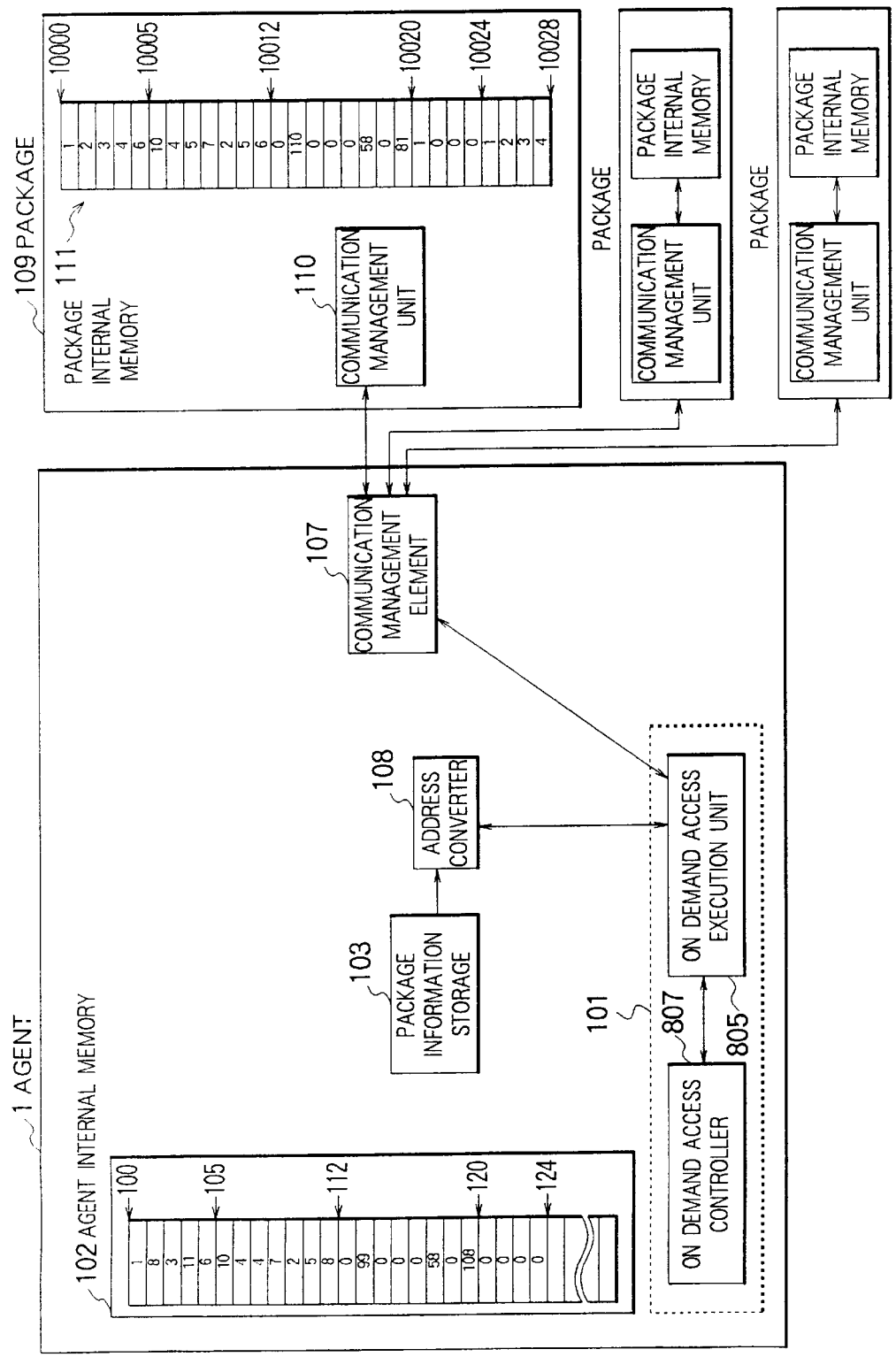
FIG. 10 is a block diagram for use in describing an on demand access processing portion which is a part of the network system illustrated in FIG. 1 in detail.
Figure 11:
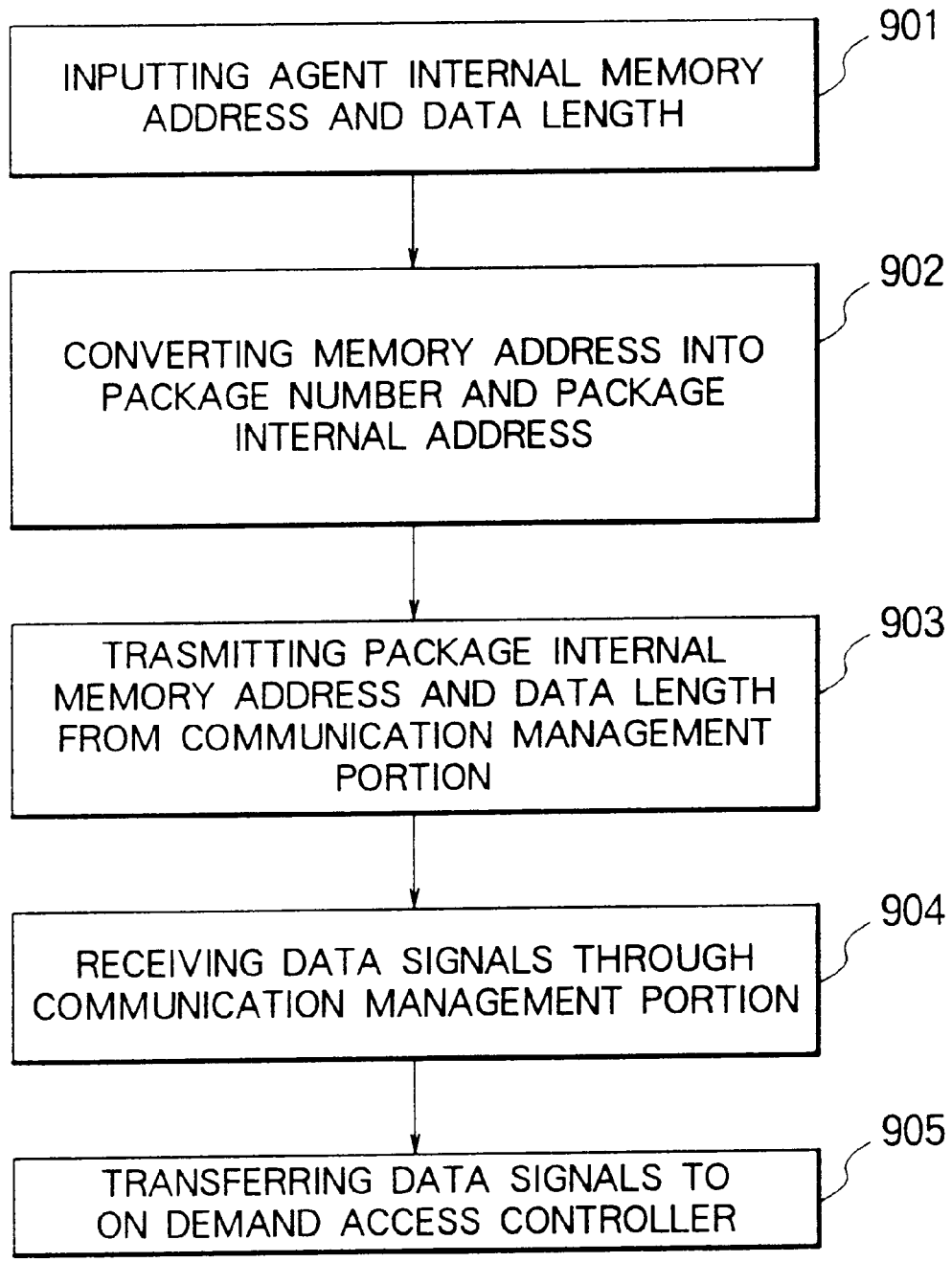
FIG. 11 is a flow chart for use in describing one operation of the on demand access processing portion.
Figure 12:
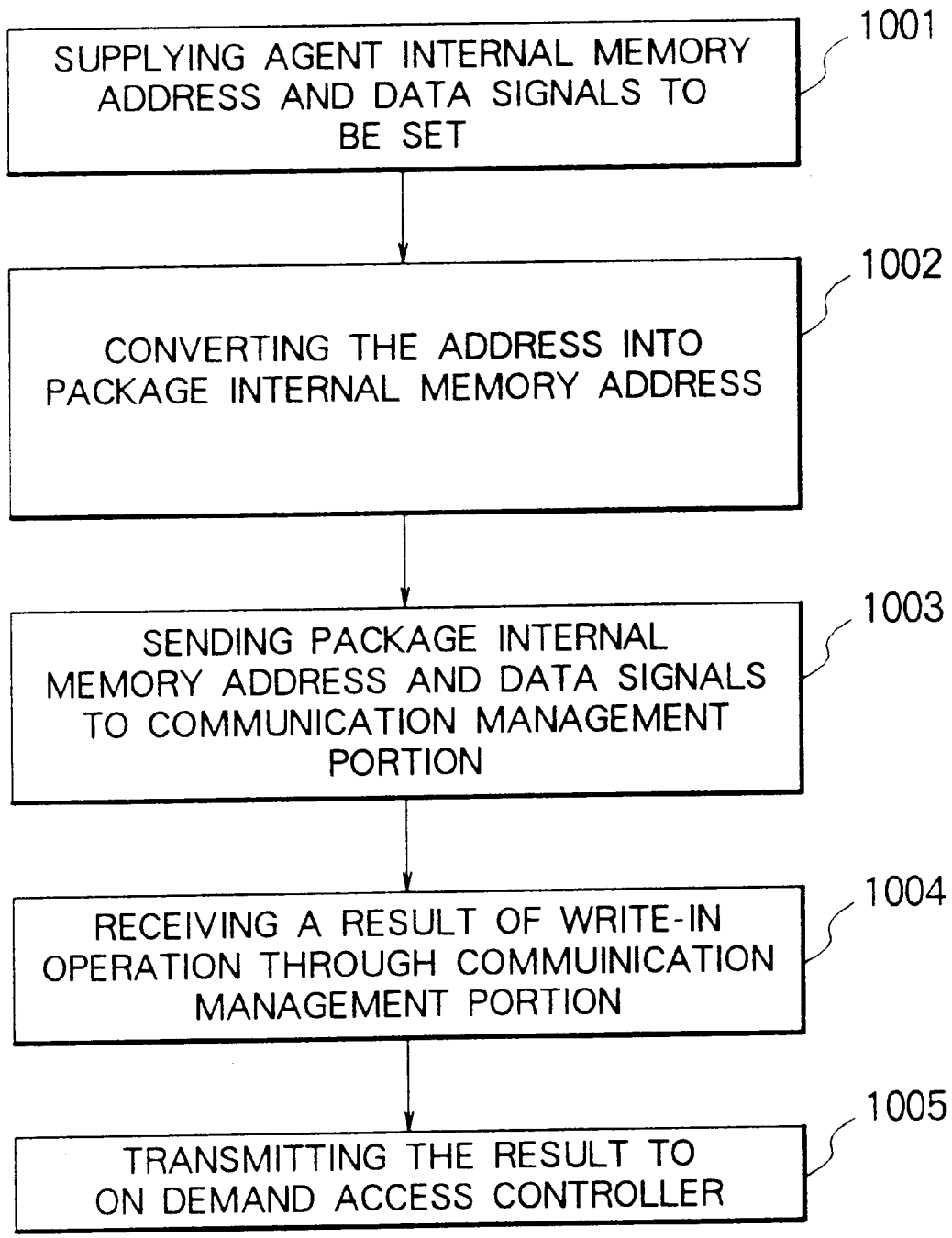
FIG. 12 is a flow chart for use in describing another operation of the on demand access processing portion.

Referring to FIGS. 10, 11, and 12, the on demand access processing portion 101 will be described in structure and operation for a better understanding of this invention. In FIG. 10, the on demand access processing portion 101 has an on demand access execution unit 805 and an on demand access controller 807 and executes acquisition of managed data signals from the packages 109 and setting of managed data signals to the packages 109 on demand. The following description will be made about the acquisition of the managed data signals and thereafter about setting the managed data signals.

(1) Acquisition of the managed data signals from the package internal memory in each package:

In this case, the on demand access controller 807 is operable to indicate managed data signals to be acquired to the access execution unit 805.

Supplied with a data setting command from an external device (such as a manager), the on demand access controller 807 sends an agent internal memory address and a data length to the on demand access execution unit 805 on demand (step 901). The agent internal memory address corresponds to a leading address of that area of the package internal memory 111 which stores the data signals to be acquired while the data length is a length of data signals to be acquired.

In this event, when the data signals to be acquired are stored in the nontransfer area 205, the agent internal memory address can not be used in the agent 1 and, instead, the nontransfer area corresponding address is indicated which is stored in the package management table 301, as mentioned before.

The on demand access execution unit 805 supplies the communication management portion 107 with the package number, the package internal memory address, and the data length (step 902). As shown at the step 902, both of the package number and the package internal memory address are obtained by converting, by the address converter 108, the address sent from the on demand access controller 807 while the data length is notified by the on demand access controller 807.

The communication management portion 107 transmits the package internal memory address and the data length to the communication management unit 110 of the package corresponding to the notified package number (step 903).

The communication management unit 110 of the package accesses the package internal memory.111 and acquires, from the notified address, the data signals which have the notified data length. The acquired data signals are transferred from the communication management portion 107 to be received therein (step 904).

The communication management portion 107 transfers the received data signals through the on demand access execution unit 805 and the on demand access controller 807 to the external device (step 905).

(2) Setting of the data signals into the package internal memory in the package:

Responsive to a data set command from an external device, such as a manager, the on demand access controller 807 supplies the on demand access execution unit 805 with the agent internal memory address of the agent internal memory 102 and data signals to be set (step 1001). Since the data signals are set into a zone of the package internal memory 111 which is specified by a leading address, the agent internal memory address corresponds to the leading address of the zone of the package internal memory 111 and may be called an input address.

Herein, it is assumed that the data signals are set into the nontransfer area 205. In this case, the agent internal memory address can be used as the input address and, instead, the nontransfer area corresponding address is designated which is kept in the package management table 301.

The on demand access execution unit 805 converts the input address into a package number and a package internal memory address by the use of the address converter 108 and notifies the communication management portion 107 of the package number and the package internal memory address along with the data signals sent from the on demand access controller 807 (step 1002).

The communication management portion 107 sends the data signals and the package internal memory address to the communication management unit 110 of the package 109 indicated by the package number (step 1003).

The communication management unit 110 of the package 109 writes the data signals transferred from the agent 1 into the zone of the package internal memory 111 which has the leading address specified by the package internal memory address. A result of the write-in operation is received by the communication management unit 110 to be sent to the communication management portion 107 of the agent 1 (step 1004). For example, if the communication management unit 110 of the package 109 fails to write the data signal in the package internal memory 111 for some reason, failure of the write-in operation is transmitted from the communication management unit 110 of the package 109 to the communication management portion 107 of the agent 1. On the other hand, if the write-in operation is successful, the success of the write-in operation is transmitted to the communication management portion 107 of the agent 1.

Responsive to the failure or the success of the write-in operation, the communication management portion 107 notifies the on demand access execution unit 805 of the failure or the success. Such a notification related to the failure or the success is transmitted through the on demand access controller 807 to the external device (step 1005).

Figure 13:
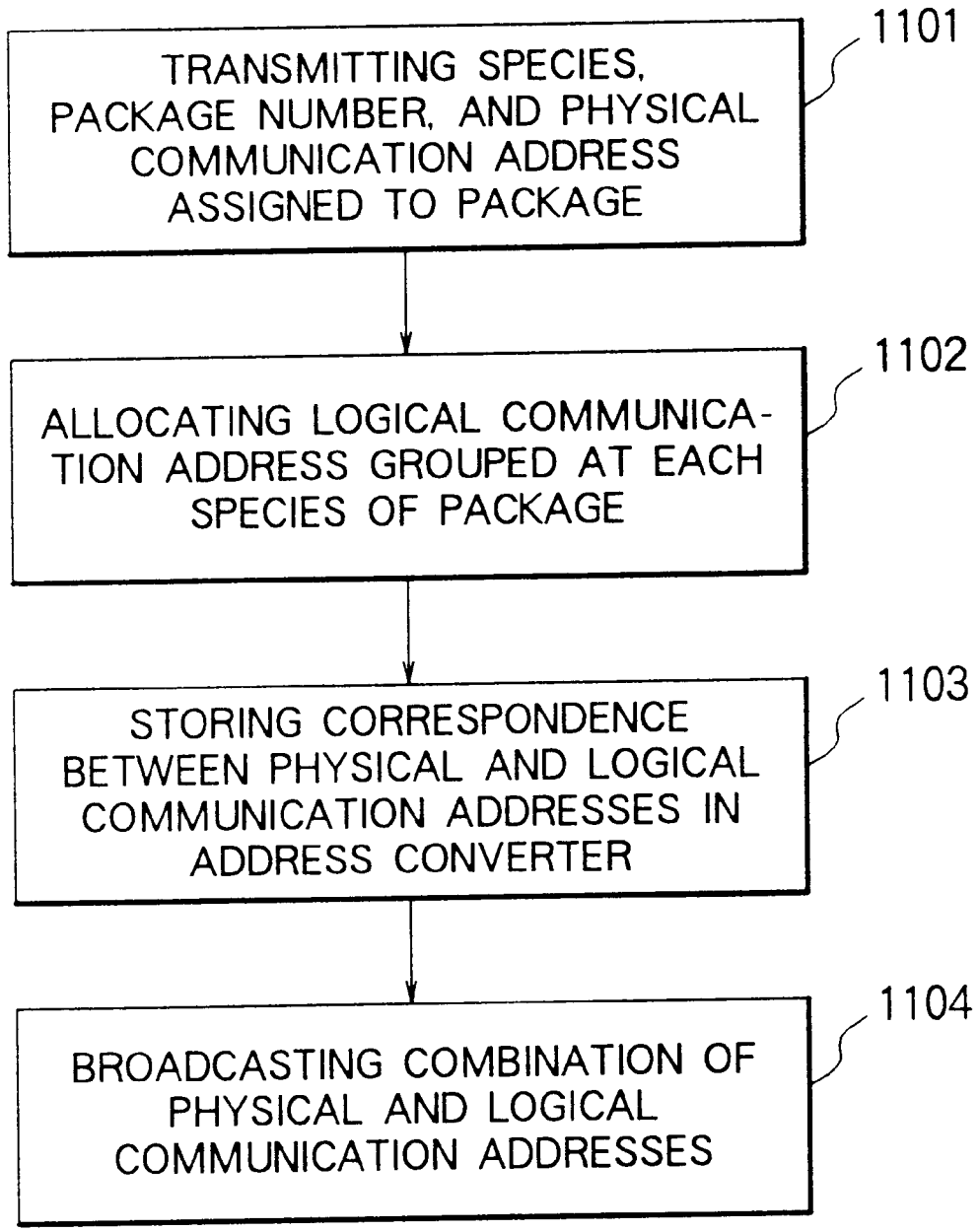
FIG. 13 is a flow chart for describing allocation of a logical communication address, which is carried out on initialization of each communication package.
Figure 14:
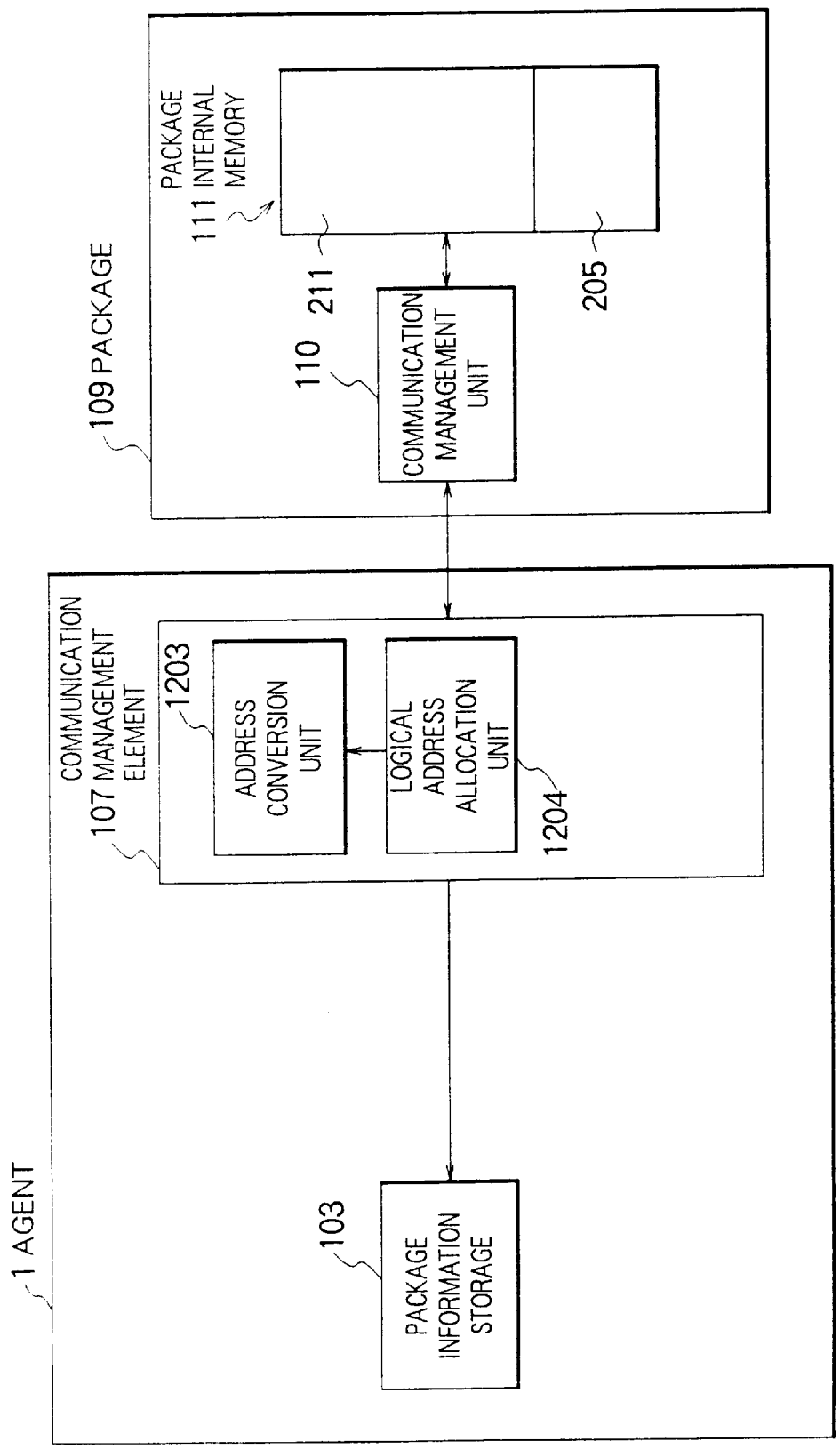
FIG. 14 is a block diagram for use in describing an agent communication management portion in detail.

Referring to FIGS. 13 and 14, description will be made about an operation of the communication management portion 107 included in the agent 1.

In general, a communication address which indicates each of the packages may be classified into a physical communication address which is previously assigned to each package and a logical communication address which can be made to correspond to the physical communication address within the transmission path.

In the illustrated example, the logical communication address is used as a communication address which designates each package 109 from the agent 1 in order to enable systematic management of a whole system. The logical communication address may be, for example, the slot number, an IP address, and the like.

A correspondence between the package numbers and the logical communication addresses is managed by the agent 1 while each logical communication address which corresponds to a physical communication address assigned to each package is managed by each package.

However, it should be considered in a network which enables modification or addition of package or packages that the agent 1 can not manage all of the package numbers and the logical communication addresses in an initial state and that each package can not know a logical communication address assigned thereto.

The illustrated communication management portion 107 can solve the above-mentioned problems in a manner to be described.

In FIG. 13, it is assumed that a package 109 is present which has no correspondence between the package physical communication address and the logical communication address. On initializing the package 109, the communication management unit 110 included in the package 109 in question transmits, to the transmission path 112, an address allocation request which has, as an argument, a species of the package, a package number, and a physical communication address of the package 109 (step 1101).

As shown in FIG. 14, the communication management portion 107 of the agent 1 includes an address conversion unit 1203 and a logical address allocation unit 1204. Supplied with the address allocation request from the package 109 through the transmission path 112, the logical address allocation unit 1204 allots a logical communication address to the physical communication address included in the address allocation request (step 1102). Such allocation of a logical communication address to a physical communication address is made in accordance with a rule wherein a physical communication address of a package which belongs to an identical group is given a logical communication address which belongs to the same group.

Thus, the logical communication address is determined by the logical address allocation unit 1204 in response to the address allocation request issued from the package 109. Under the circumstances, the communication management portion 107 transmits the logical communication address determined by the logical address allocation unit 1204 to the package 109 which issues the address allocation request. In addition, the correspondence between the package number of the package 109 in question and the logical communication address is memorized into the address converter 1203 (step 1103).

On transmission of the logical communication address, the package 109 which issues the address allocation request does not know the logical communication address assigned to the package itself. Therefore, a pair of the physical and the logical communication addresses is broadcast from the agent 1 to all of the packages 109 and, as a result, only the package 109 in question detects its own physical communication addres and thereafter receives the logical communication address assigned thereto.

Specifically, when the communication management unit 110 of the package 109 which issues the address allocation request receives the logical communication address determined by the agent, the logical. communication address is stored in the communication management unit 110. On the next following communication, the allocated logical communication address is attached as an identifier to transmission data signals.

On the other hand, the communication management portion of the agent 1 refers to the correspondence between the logical communication address assigned to the package 109 and the package number stored in the address conversion unit 1203 to detect the logical communication address when the package number is given as a destination package from the on demand access processing portion 101 and the polling processing portion 104. Thus, communication can be carried out between the destination package and the agent 1.

In the meanwhile, on addition of a new package 109, the agent 1 can not know package information which is related to the new package and which includes data configuration information and memory arrangement information. Although the package information will be described later in detail, it suffices to understand for the time being that the data configuration information is representative of a data configuration of the package internal memory 111 while the memory arrangement information is representative of a memory arrangement of the package internal memory 111.

In any event, the agent can not carry out management operation, such as the polling, in relation to the new package before such package information is received. Taking this into consideration, it is preferable that the agent 1 can automatically receive the package information mentioned above.

Referring to FIG. 5, 14, 15, and 16, description will be made about such automatic reception of the package information in the agent 1. In the illustrated example, first and second processing modes (A) and (B) are executed to obtain the package information.

Figure 15:
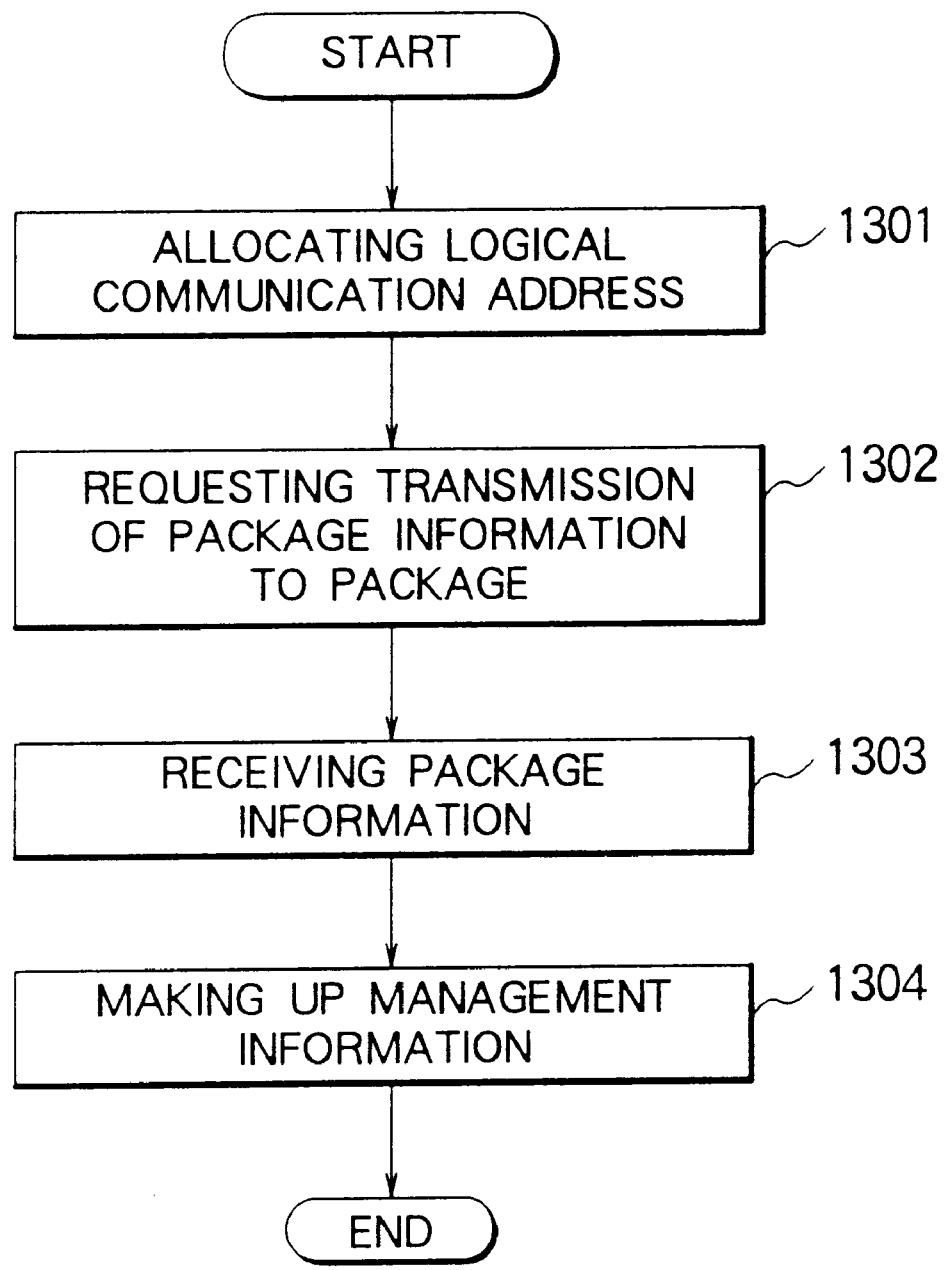
FIG. 15 is a flow chart for use in describing an operation of the agent communication management portion.

(A) As shown in FIG. 15, the communication management portion 107 at first allocates a logical communication address to a new package (step 1301) and issues a package information transmission request to the new package (step 1302). Responsive to the package information transmission request, the new package transmits its own package information to the communication management portion 107 of the agent 1 (step 1303).

In the interim, the package information includes the following information enumerated hereinunder.

The package information includes package address information, status length information, threhold information, and polling information indicative of whether or not the polling can be carried out in connection with the package in question. Specifically, the package address information includes leading and end addresses of the first, the second, the third, the fourth, and the fifth groups in the package internal memory 111. The status length information includes a data length of each data signal in the second group. The threshold information includes a data length, a high threshold value, and a low threshold value of each data signal in the third group.

Referring back to FIG. 15, t he communication management portion 107 of the agent 1 produces management information in relation to the new package on the basis of the package information received from the new package and sends the management information to the package information storage 103 (step 1304). Specifically, a single one of the rows is added as a new row to the package management table 301 (FIG. 5). In this case, the package number and the package internal memory address corresponding to the leading address of the transfer area of the package are set into the slot 302 and MIBad of the package management table 301, respectively. Likewise, the package internal virtual address corresponding to the leading address of the nontransfer area 205 of the package 109 and the polling information are set into ONad 304 and ONOff 305, respectively. The threshold information table 316 (FIG. 5) is also added in response to the threshold information and a leading address is added to the THptr 306 of the new row of the package management table 301.

Moreover, if the package address table 308 has no row which corresponds to the species of the new package, a new row is added to the package address table 308 in accordance with the package address information received. Likewise, a new single row is also added to the status length table 321 in accordance with the status length data signal and its leading address is set into STptr of the package address table 308 in the new single row.

Figure 16:
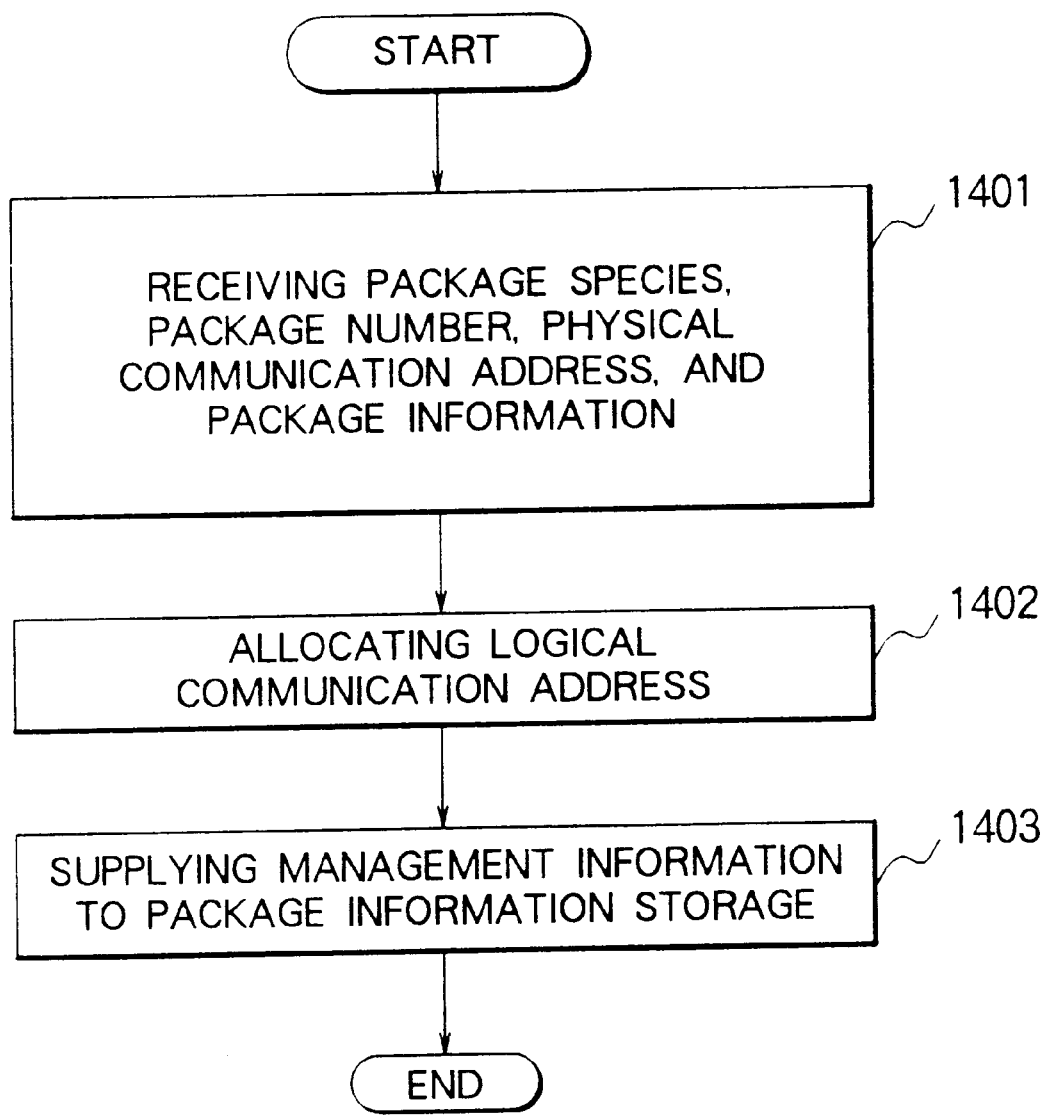
FIG. 16 is a flow chart for use in describing another operation of the agent communication management portion.

(B) The second processing operation:

As shown in FIG. 16, a new package 109 to be initialized transmits an address allocation request to the agent 1 through the transmission path 112 on initializing the new package 109. In this case, the address allocation request includes a package species of the new package 109, a package number, and a physical communication address assigned to the new package 109. In addition, the new package 109 also transmits package information, as mentioned before, to the transmission path 112. When the package species, the package number, the physical communication address, and the package information are received by the communication management portion 107 of the agent 1 (step 1401), the communication management portion 107 allocates a logical communication address in the manner described before (step 1402) and supplies the package information storage 103 to management information concerned with the new package 109 on the basis of the package information received from the new package 109 (step 1403).

Figure 17:
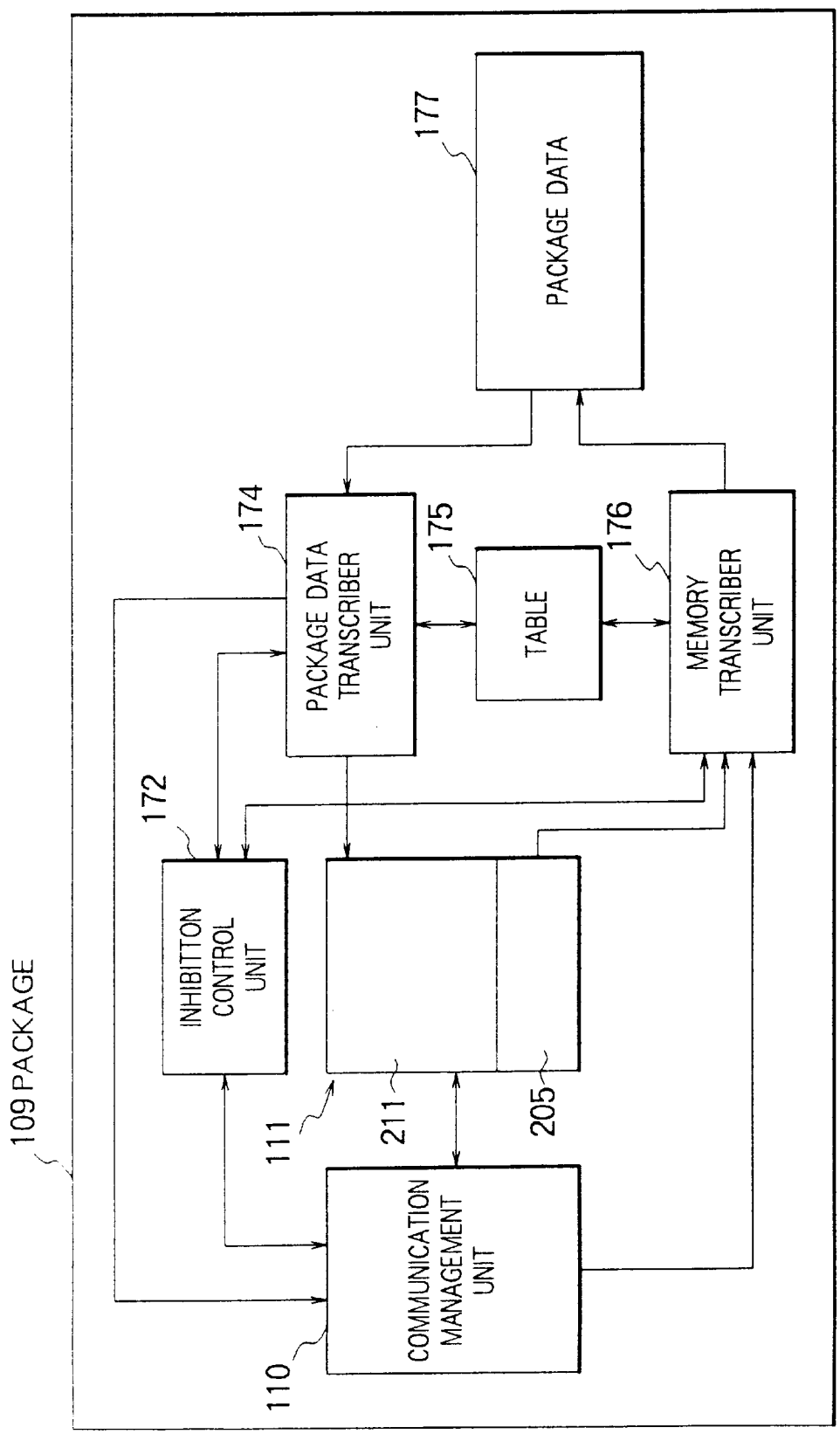
FIG. 17 is a block diagram for use in describing the communication package in detail.

Referring to FIG. 1 and FIG. 17, description will be made about each of the packages 109. The package 109 illustrated in FIG. 17 includes an inhibition control unit 172, a package data transcriber unit 174, a table 175, a memory transcriber unit 176, and a package data memory 177, in addtion to the communication management unit 110 and the package internal memory 111 (both illustrated in FIG. 1).

Specifically, the inhibition control unit 172 is operable to inhibit an access operation to the package internal memory 111 and stores flags indicative of whether or not an access operation is possible and a queue for recording device names which are waiting for the access to the package internal memory 111. The inhibition control unit 172 cooperates with devices, such as 110, 174, and 176, which access the package internal memory 111 in a manner to be described later.

When the package internal memory 111 receives an access request from another device with the flag kept in an accessible state, the inhibition control unit 172 changes the flag to an unaccessible state and issues an access request to the device to allow an access to the package internal memory 111. On the other hand, when an access request is received from a device with the flag kept in the unaccessible state, a device name of the device is recorded or registered at the end of the queue. The device which is registered in the queue interrupts its operation before reception of a call from the inhibit control unit 172.

A device which is accessing the package internal memory 111 reports to the inhibition control unit 172 that the access operation is finished on completion of the access operation. When the queue keeps a registered device or devices, the inhibition control unit 172 calls a leading one of the registered devices.

The package data signals 177 are representative of an aggregation of package states, such as terminals, of LSI elements and the like which structure the package 109. The table 175 serves to make data elements of the package data signals correspond to positions of the package internal memory 111. Contents of the table 175 are previously registered by a manufacturer on production of the packages.

In FIG. 17, the package data transcriber unit 176 periodically reads the package data signals 177 kept in the table 175 and the package data signals 177 are transcribed into the transfer area 211 of the package internal memory 111. In this case, the package data transcriber unit 174 controls the inhibition control unit 172 to carry out inhibition control of the package internal memory 111 during transcription of the package data signals.

In addition, when the fourth group of the data signals, such as the alarm signals, stored in the transfer area 211 is transcribed with the previous values kept, the package data transcriber unit 174 compares the previous values with the data signals of the fourth group and notifies the communication management unit 110 of the addresses of the data signals when the data signals are changed from the previous values.

Subsequently, a write-in operation is carried out in the following manners when the communication management unit 110 is operable to write data signals into the package internal memory 111 in response to an indication issued from the agent 1. At first, the communication management unit 110 energizes the inhibition control unit 172 to inhibit the package internal memory 111 by the inhibition control unit 172. Thereafter, the communication management portion 110 notifies the memory transcriber unit 176 of both a leading address of the package internal memory 111 and a length of write-in data signals. Such write-in data signals are successively stored from the leading address over the data length.

The memory transcriber unit 176 makes the inhibition control unit 172 carry out the inhibition control to the package internal memory 111 and reads the contents out of the addresses written by the communication management unit 110 to refer to the table 175. Thus, the package data signals 177 are specified which are to be transferred to a destination and which are written in place. In the above-mentioned manner, the write-in information from the agent 1 is transcribed into the package data signals 177 through the package internal memory 111.

In addition, when the communication management unit 110 carries out a readout operation of the package internal memory 111 in response to an indication sent from the agent 1, the inhibition control is executed by the inhibition control unit 172 to inhibit the package internal memory 111. Thereafter, the data signals which are stored within an address range indicated by the agent 1 are read out of the package internal memory 111.

Herein, it is assumed that the data signals, such as the alarm signals, of the fourth group are varied in the transfer area 211 of the package internal memory 111. In this case, the address of the data signals are informed from the package data transcriber unit 174. The inhibition control unit 172 carries out the inhibition control to the package internal memory 111. Under the circumstances, the data signals are read out of the addresses of the package internal memory 111 which are informed. The addresses and the data signals are asynchronously sent to the agent 1.

Figure 18:
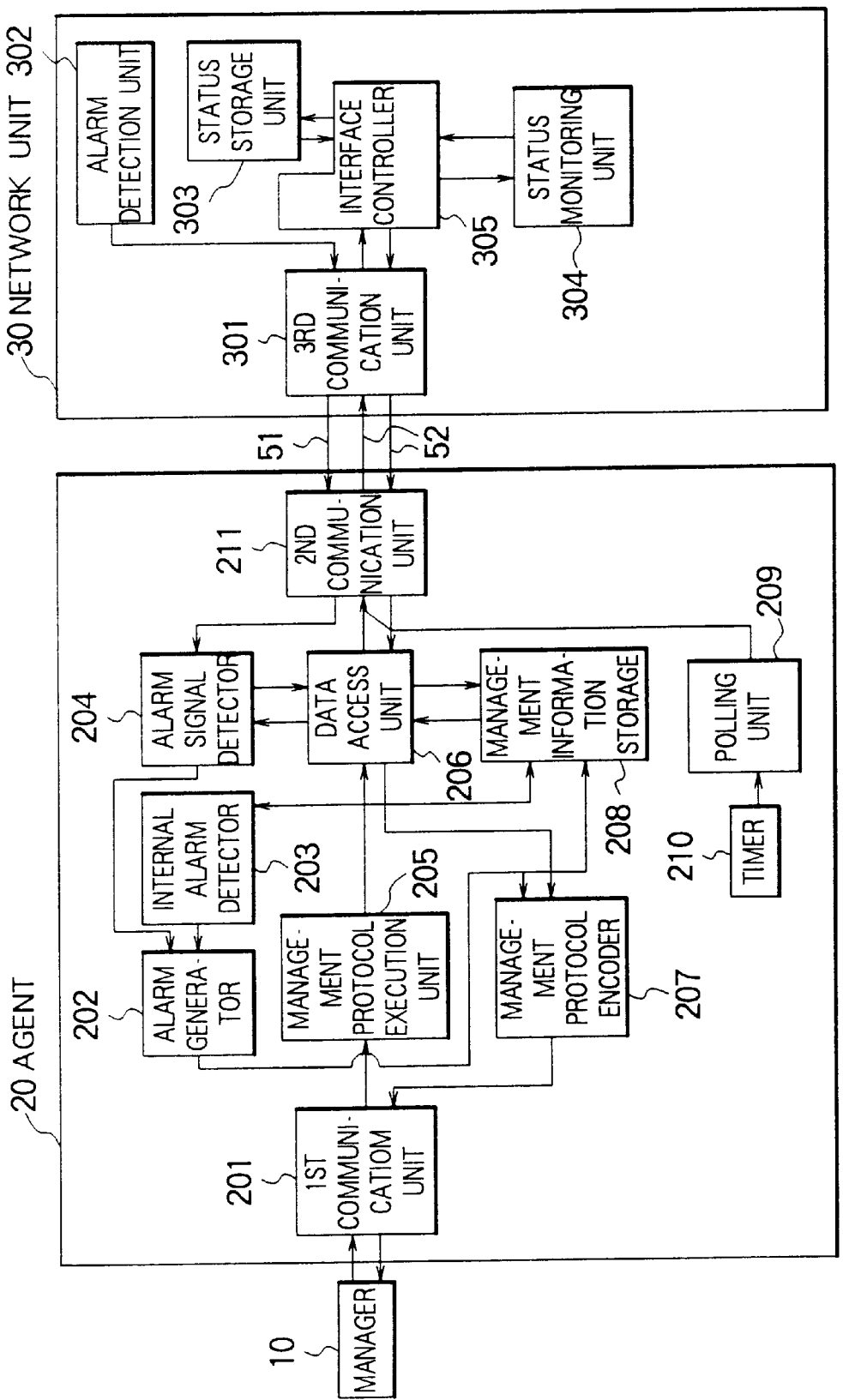
FIG. 18 is a block diagram of a network system according to a second embodiment of this invention.

Referring to FIG. 18, a network system according to a second embodiment of this invention comprises a manager 10, an agent (depicted at 20 in FIG. 18) connected to the manager 10, and a network unit (depicted at 30) which is connected to the agent 20. The agent 20 and the network unit 30 corresponds to the agent 1 and the package 109 illustrated in the above. In FIG. 18, both of the illustrated agent 20 and the illustrated network unit 30 are different in structure from the agent 1 and the package 109, as will be described later in detail and are therefore represented by different reference numerals in FIG. 18.

The agent 20 shown in FIG. 18 includes a first communication unit 201 communicable with the manager 10 in a manner to be described, an alarm generator 202, an internal alarm detector 203, an alarm signal detector 204, a management protocol execution unit 205, a data access unit 206, a management protocol encoder 207, a polling unit 209, a timer 210, and a second communication unit 211 communicable with the network unit 30. Herein, the second communication unit 211 corresponds to the communication management portion 107 (FIG. 1) while a combination of the polling unit 209 and the timer 210 corresponds to the polling processing portion 104 (FIG. 1). The second communication management portion 211 may be referred to as an agent communication management unit.

On the other hand, the network unit 30 comprises a third communication unit 301 communicable with the agent 20, an alarm detection unit 302, a status storage unit 303, a status monitoring unit 304, and an interface controller 305, all of which will be described later in detail. The third communication unit 301 corresponds to the communication management unit 110 of the package 109 (FIG. 1) and may be called a unit communication management unit.

Herein, it is to be noted that the second and the third communication units 211 and 301 are connected to each other through a single interrupt line 51 and two information lines 52 composed of a downward line and an upward line. The two information lines 52 may collectively be called a transmission path.

With this structure, the manager 10 issues a manager access request of transmitting a managed data signal or signals to be managed to the agent 20. In this event, the manager access request is sent to the first communication unit 201 in the form of a coded signal coded in accordance with a coding rule determined between the manager 10 and the agent 20.

Herein, it is to be noted that the managed data signal collectively represent a current state, a performance, a past state, a set state of the network unit 30, all of which are necessary for managing the network unit 30 and that the access request indicates a readout operation or a setting operation of the managed data signal. Such managed data signals are stored in the management information storage 208 of the agent 20 and/or the status storage unit 303 of the network unit 30.

Moreover, the managed data signals are divided into a first-class managed data signal stored only in the status storage unit 303 of the network unit 30, a second-class managed data signal stored in both the management information storage 208 of the agent 20 and the status storage unit 303 of the network unit 30, and a third-class managed data signal stored only in the management information storage 208 of the agent 20. The first through the third managed data signals are processed in different manners, as will become clear as the description proceeds. Specifically, when the first-class managed data signal is processed in the network system, readout and write-in operation of the first-class managed data signal is carried out in relation to the status storage unit 303 alone. The first-class managed data signal may be, for example, a data signal which is varied in a high speed in the network unit 30. On processing the second-class managed data signal which is mainly representative of a performance or the like of the network unit 30, readout operation is carried out from the management information storage 208 of the agent 20 while write-in operation is carried out to the status storage unit 303. Furthermore, when the third-class managed data signal is processed, readout and write-in operations are carried out in relation to the management information storage 208. The third-class managed data signal includes a data signal concerned with an event forwarding discriminator (not shown) and a managed data signal which is produced by the agent 20. The event forwarding discriminator serves to transmit an event representative of a degree of importance of an alarm, from the agent 20 to the manager 10.

In the illustrated agent 20, the first communication unit 201 is operable to receive a request issued from the manager 10 or to transmit a notification, such as a response or an alarm, to the manager 10 in reply to the request. The first communication unit 201 is connected to the management protocol execution unit 205 which receives a management operation request from the manager 10 through the first communication unit 201.

The management protocol execution unit 205 interprets the management operation request in accordance with a coding rule determined between the manager 10 and the agent 20 to specify the managed data signal which is processed in response to the management operation request. Thereafter, the management protocol execution unit 205 supplies the data access unit 206 with a request of processing the managed data signal specified by the management protocol execution unit 205. In the data access unit 206, the management operation is carried out in connection with the managed data signal to read or to set values related to the managed data signal. To this end, the data access unit 206 carries out an access operation to the management information storage 208

Figure 19:
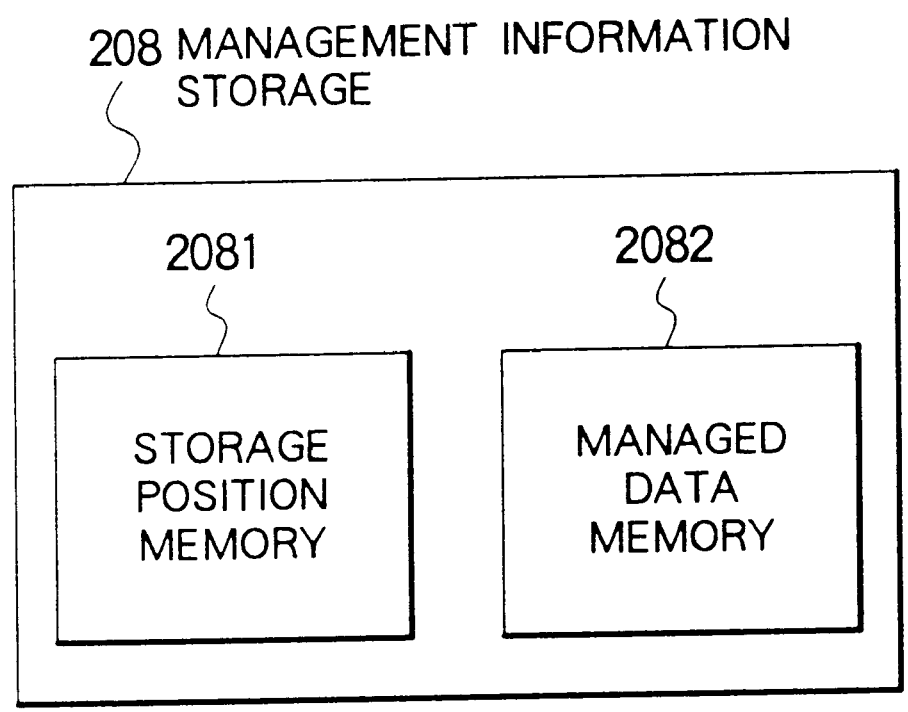
FIG. 19 is a block diagram for use in describing a management information storage included in FIG. 18.

Referring to FIGS. 18 and 19, description will be made about the access operation from the data access unit 206 to the management information storage 208. As illustrated in FIG. 19, the management information storage 208 has a storage position memory 2081 and a managed data memory 2082. The storage position memory 2081 stores storage position information of each managed data signal. Specifically, the storage position information is specified by element information which represents an element or unit included in the network system to store each managed data signal in question. In addition, a storage location in the element or unit is also included as storage location information in the storage position information. On the other hand, the managed data memory 2082 stores the managed data signals.

As mentioned before, when the management information storage 208 is accessed by the data access unit 206, the element or unit and the storage location which corresponds to the managed data signal in question are read out of the storage position memory 2081 and are sent to the data access unit 206.

Supplied with the element information and the storage location information from the storage position memory 2081, the data access unit 206 accesses either the managed data memory 2082 of the management information storage 208 or the status storage unit 303 of the network unit 30 through the second communication unit 211, a downward one of the information signal line 52, and the third communication unit 301.

In the illustrated example, the management protocol encoder 207 is included in the agent 20 to communicate with the manager 10 and is connected to the alarm generator 202 and the data access unit 206 to receive notification sent from the alarm generator 202 and a result of the management operation sent from the data access unit 206, respectively. This shows that the data access unit 206 executes the management operation in connection with the managed data signal specified by the management protocol execution unit 205. The above-mentioned notification and the result are converted into codes in accordance with the coding rule determined between the manager 10 and the agent 20 and are sent to the manager 10.

The remaining elements included in the agent 20 will be described later in detail in connection with operations carried out in relation to the network unit 30.

In the network unit 30 illustrated in FIG. 18, the third communication unit 301 is connected to the alarm detection unit 302 and the interface controller 305 which is connected to the status storage unit 303 and the status monitoring unit 304. Herein, it is to be noted that the alarm detection unit 302 detects a fault which might occur in the network unit 30 to produce a fault signal representative of occurrence of the fault. The fault signal is transmitted through the third communication unit 301, the interrupt signal line 51, and the second communication unit 211 to the alarm signals detector 204. The fault signal should be quickly transmitted to the agent 20 because the fault signal appears in an emergency state.

As mentioned above, the fault signal itself is sent from the alarm detection unit 302 to the agent 20. However, a content of the fault is sent as a fault detailed report from the alarm detection unit 302 to the status storage unit 303 through the interface controller 305 as an alarm data signal. The alarm data signal is stored in the status storage unit 303 together with the managed data signals which are left in the network unit 30.

Thus, the interface controller 305 controls data transmission between the status storage unit 303 and the other elements concerned with the managed data signals. The status monitoring unit 304 which is connected to the interface controller 305 collects the managed data signals in the network unit 30 to map them on predetermined positions of the status storage unit 301 and modifies or varies values of the managed data signals in the network unit 30 when the data signals in the status storage unit 303 are rewritten from the agent 20. The third communication unit 301 is operable to receive a transmission data signal from the agent 20 through the information signal line 52 and to transmit a reply to the transmission data signal to the network unit 30. In addition, the third communication unit 30 is also operable to transmit the alarm signal or the fault signal from the alarm detection unit 302 to the second communication unit 311 through the interrupt signal line.

For a better understanding of this invention, description will be directed to operations of the interface controller, the status storage unit 303, and the status monitoring unit 304, all of which are included in the network unit 30. In the illustrated example, it is assumed that the status storage unit 303 has a memory for storing the managed data signals while the interface controller 305 has a first interface for the third communication unit 301 and a second interfce for the status monitoring unit 304. Both the first and the second interfaces are individually operated in parallel.

Figure 20:
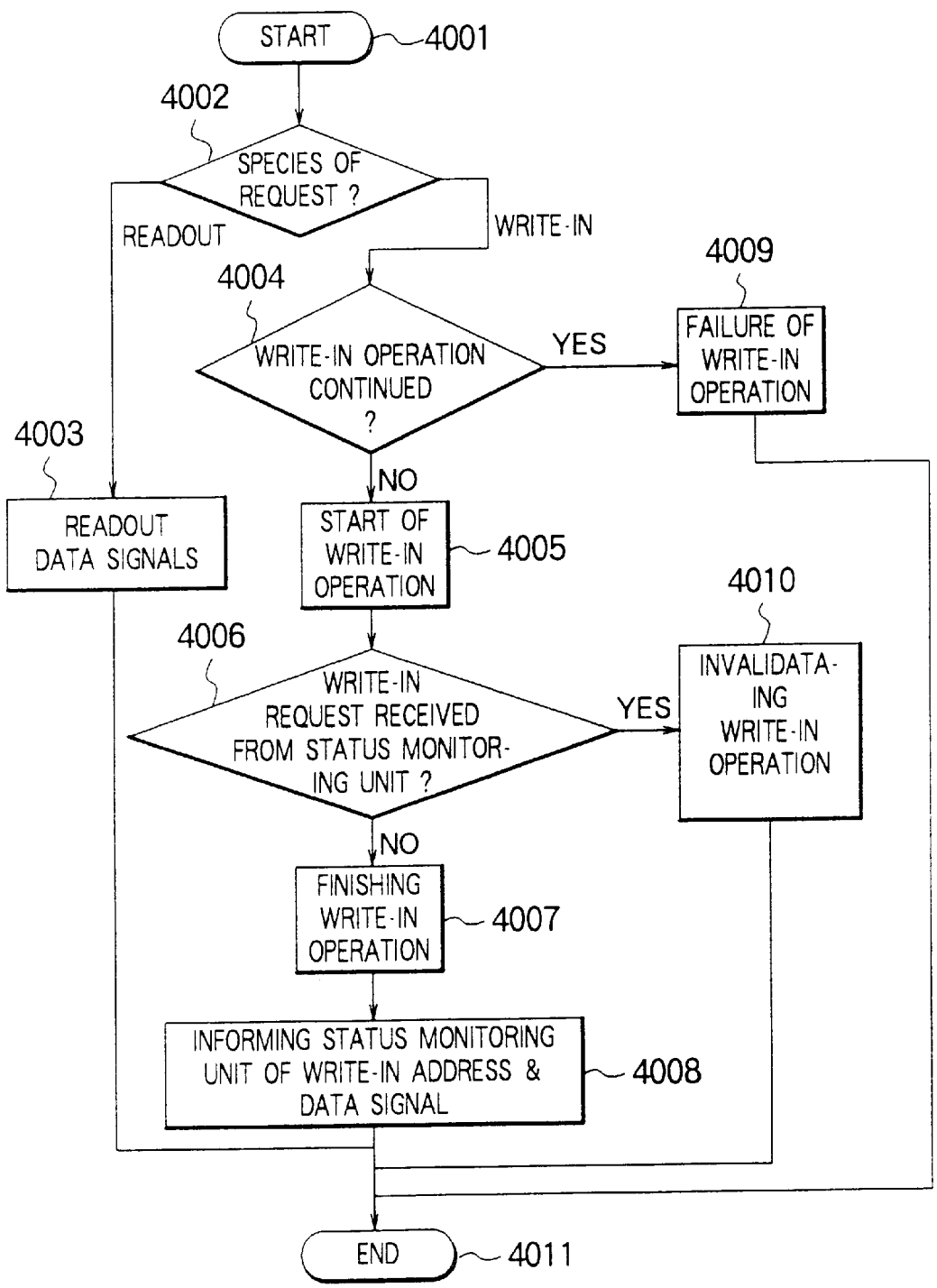
FIG. 20 is a flow chart for use in describing operation which is carried out in a network unit.

Referring to FIG. 20, the operation of the interface controller 305 will be mentioned in conjunction with the status monitoring unit 304 and the third communication unit 301 and starts operation (step 4001) to receive a request from the agent 20 through the third communication unit 301. The status monitoring unit 304 judges the species of the request to determine whether the request is a readout request or a write-in request (step 4002). On reception of the readout request, requested data signals are read out of the status storage unit 303 (step 4003) under control of the interface controller 305.

To the contrary, the write-in request is judged, the interface controller 305 detects whether or not the write-in operation in the status storage unit 303 is being continued or carried out from the status monitoring unit 304 (step 4004).

If the write-in operation is not carried out in the status storage unit 303, the interface controller 305 starts the write-in operation (step 4005). During the write-in operation, the interface controller 305 checks whether or not a write-in request is received from the status monitoring unit 304 (step 4006) and finishes or completes the write-in operation on no reception of the write-in request from the status monitoring unit 304 (step 4007). After completion of the write-in operation, the interface controller 305 asynchronously informs the status monitoring unit 304 of write-in addresses and write-in data signals.

If the write-in operation is being continued in the status storage unit 303 at the step 4004, the interface controller 305 informs the thrid communication unit 301 of failure of the write-in operation (step 4009) and stops the write-in operation.

In addition, when the write-in request is received from the status monitoring unit 304, the interface controller 305 invalidates the write-in request sent through the third communication unit 301 and notifies the agent 20 of failure of the write-in operation and stops the write-in operation (step 4010).

From this fact, it is readily understood that when a conflict of the write-in requests takes place between the agent 20 and the network unit 30, the interface controller 305 processes the write-in request of the network unit 30 in preference to that of the agent 20.

Figure 21:
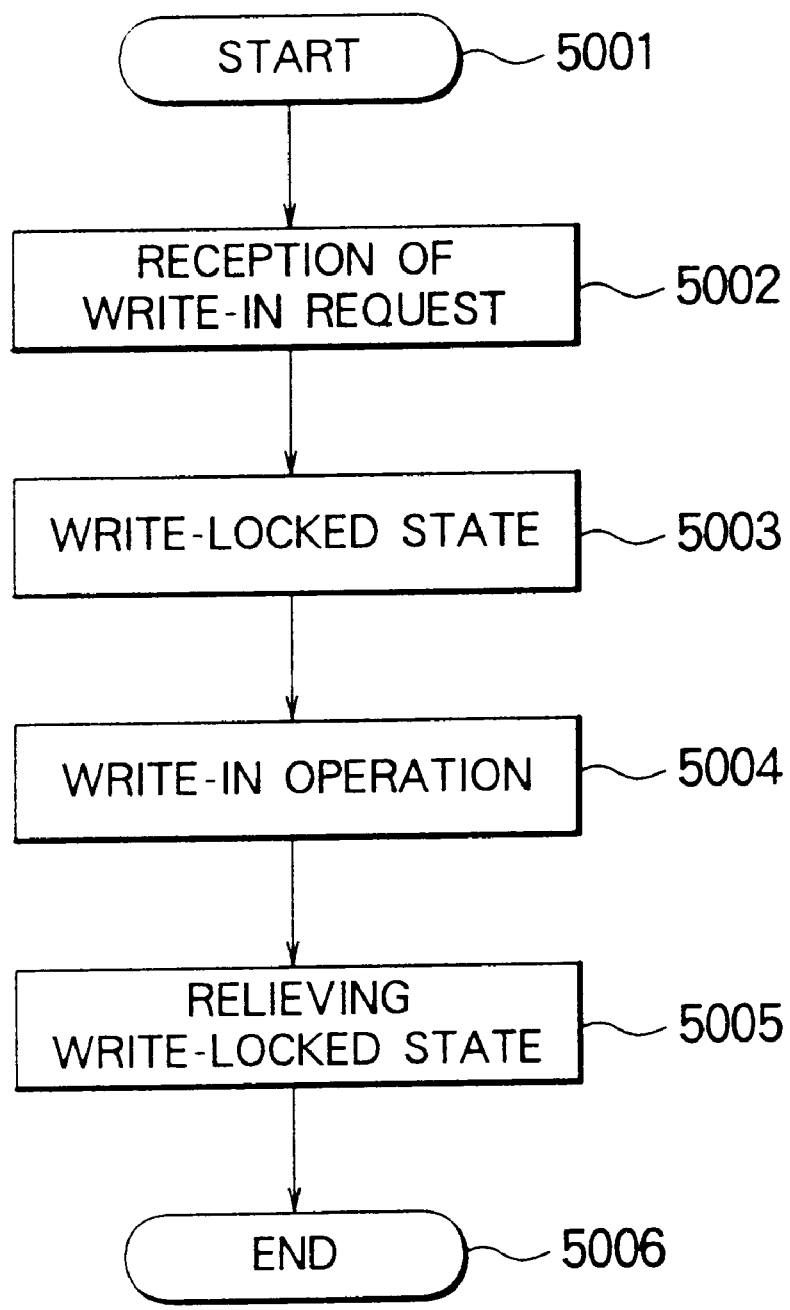
FIG. 21 is a flow chart for use in describing another operation which is carried out in the network unit.

Referring to FIG. 21, the status monitoring unit 304 accesses the status storage unit 303 through the interface controller 305 in the illustrated manner. Specifically, the interface controller 305 starts operation (step 5001) and receives a write-in request from the status monitoring unit 304 (step 5002) and puts the status storage unit 303 into a locked state against a following write-in request. Consequently, the status storage unit 303 is put into a write-locked state (step 5003). Thereafter, the write-in operation is carried out from the interface controller 305 to the status storage unit 303 (step 5004). After completion of the write-in operation, the interface controller 305 relieves the write-locked state (step 5005) and finishes the write-in operation. During the write-locked state, the status storage unit 303 can be accessed only by the interface controller 305 which indicates the write-locked state and cannot be accessed by any other elements except the interface controller 305.

Figure 22:
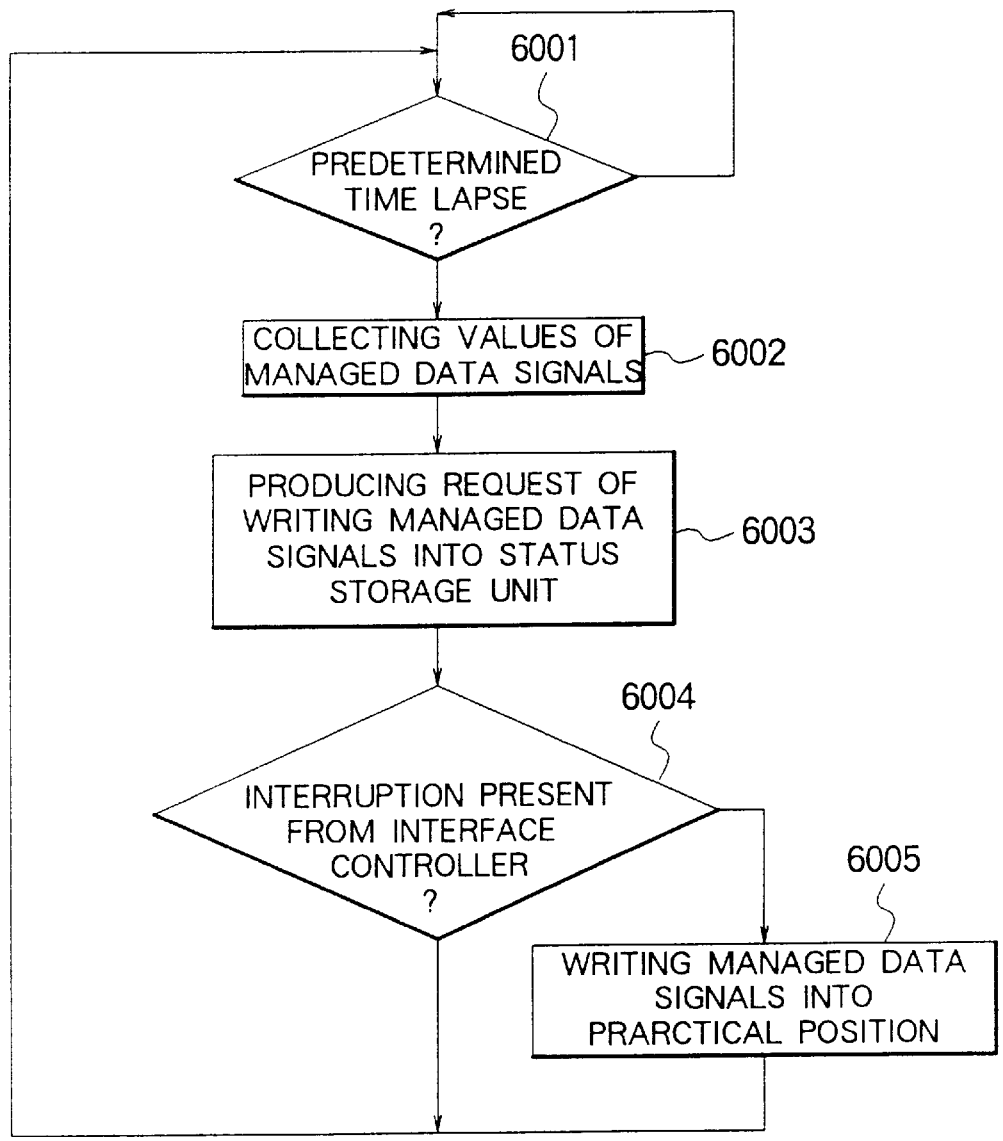
FIG. 22 is a flow chart for use in describing operation which is carried out in a status monitoring unit illustrated in FIG. 18.

Referring to FIG. 22, the status monitoring unit 304 in the network unit 30 monitors whether or not a predermined time lapses (step 6001) and acquires and collects managed data signals in-the network unit 30 each time when the predetermined time lapses (step 6002). It is to be noted that the status monitoring unit 304 has a conversion table which exhibits a correspondence between practical positions of the managed data signal in the network unit 30 and storage locations or addresses of the managed data signals in the interface controller 305.

The status monitoring unit 304 accesses the conversion table therein to obtain the storage addresses into which the managed data signals are to be written. Under the circumstances, the status monitoring unit 304 issues or produces a write-in request to the interface controller 305 to write the managed data signals into the storage addresses obtained from the conversion table (step 6003). This shows that the managed data signals are copied in the status storage unit 303.

Thereafter, the status monitoring unit 304 checks whether or not an interruption is issued or present from the interface controller 305 (step 6004). If no interruption is present, processing is returned back to the step 6001. Otherwise, the status monitoring unit 304 accesses the conversion table therein by the use of a storage address of the status storage unit 303 given on the interruption. As a result, the storage address is converted into the practical storage position in the network unit 30 in which the managed data signals are written (step 6005).

The above description has been mainly restricted to the operation of the network unit 30. However, the network unit 30 communicates with the agent 20 in the following manner. As mentioned before, the third communication unit 301 of the network unit 30 is connected to the second communication unit 211 of the agent 20 through two information lines 52 and the single interruption line 51. In the agent 20, the data access unit 206 is connected through the second communication unit 211 to the information lines 52 while the alarm signal detector 204 is connected to the interruption line 51. In addition, the polling unit 209 is connected to the downward information line 52 that is directed towards the network unit 30. Likewise, the interface controller 305 in the network unit 30 is connected to the information lines while the alarm detection unit 302 is connected to the interruption line 51.

Figure 23:
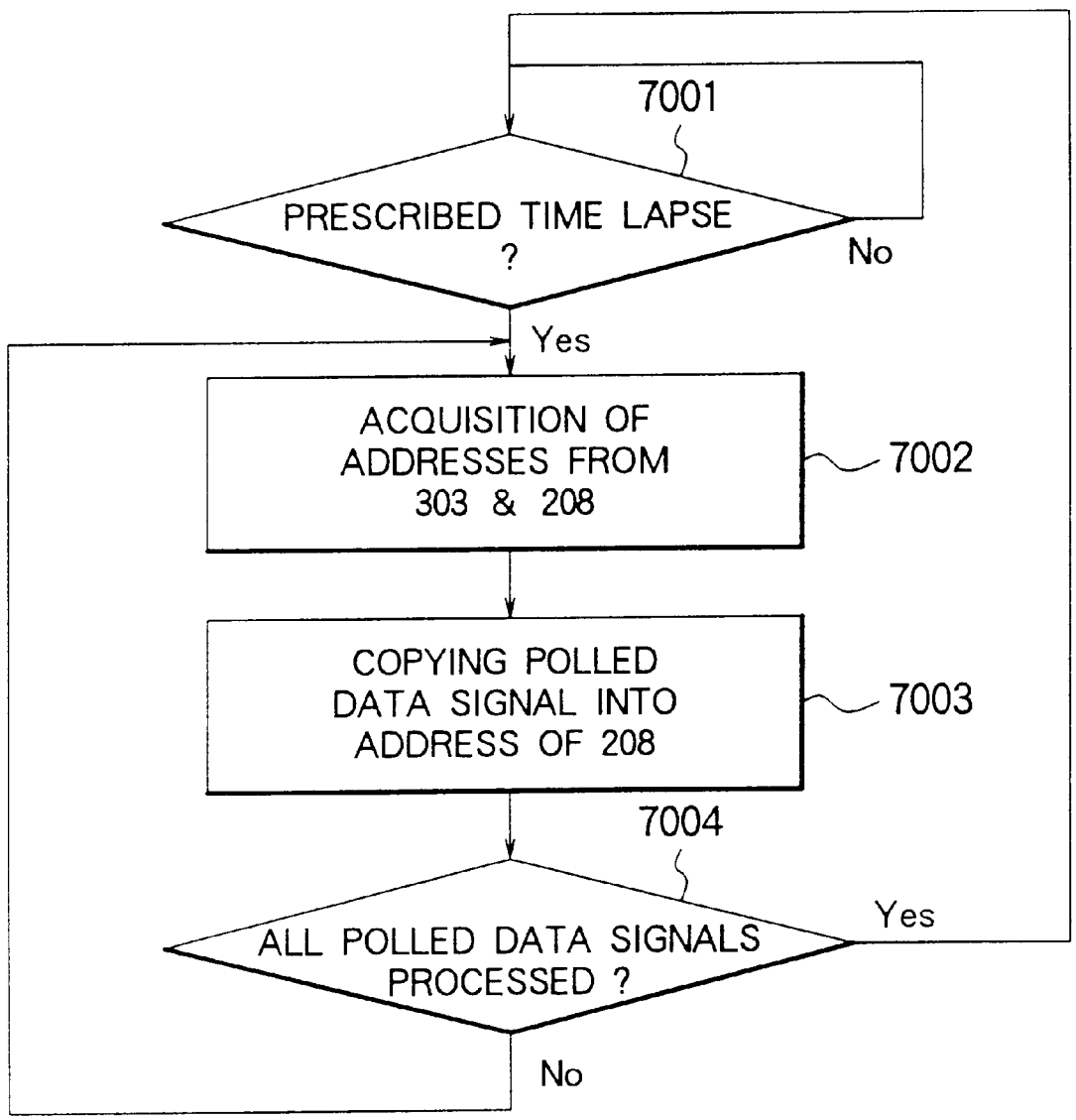
FIG. 23 is a flow chart for use in describing operation of a polling unit included in an agent illustrated in FIG. 18.

Referring to FIG. 23, description will be made about operation of the polling unit 209 controlled by the timer 210. At first, the timer 210 is structured by a total polling time storage for storing a prescribed time specified by a digital value and a counter for decrementing a count at a predetermined time interval shorter than the prescribed time. In the timer 210, the prescribed time which is set in the polling time storage is copied or sent to the counter and is decremented within the counter at every predetermined time interval. When a count or a content of the counter becomes equal to zero, an interruption is issued from the timer 210 to the polling unit 209. Thereafter, the prescribed time is set into the counter again and therefore defines a polling time interval.

In FIG. 23, when the prescribed time set in the timer 210 lapses and the interruption is issued from the timer 210 to the polling unit 209 (step 7001), the polling unit 209 acquires both an address of a data signal to be polled (polled data signal) in the status storage unit 303 of the network unit 30 and an address of the polled data signal in the management information storage 208 (step 7002). Thereafter, the polled data signal in the address of the status storage unit 303 is copied into the address in the management information storage 208 (step 7003). In this state, the polling unit 209 transmits a polling signal to the second communication unit 211 in accordance with the address acquired and reads a following polled data signal. Subsequently, the polling unit 209 checks whether or not processing is finished as regards all of the polled data signals (step 7004) to transmit a polling signal as long as the polled data signals are left. At any rate, the polling signal related to the polled data signal is sent to the second communication unit 211.

Furthermore, it is possible with the illustrated network system to notify the manager 10 of occurrence of an alarm which occurs in the network unit 30 or the agent 20. To this end, the alarm detection unit 302 and the alarm signal detector 204 are operated in the network unit 30 and the agent 20, respectively.

Figure 24:
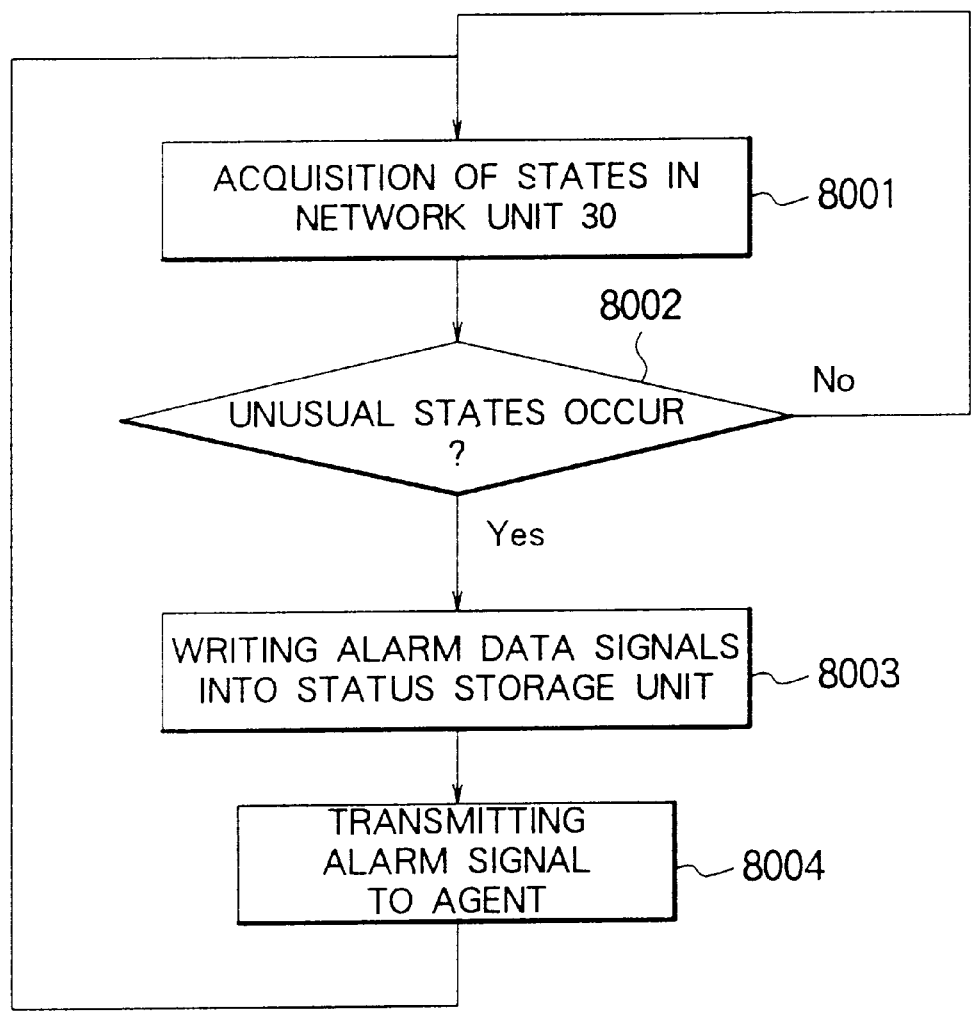
FIG. 24 is a flow chart for use in describing operation of an alarm detection unit included in the network unit.

Referring to FIG. 24, the alarm detection unit 302 is operated in a manner to be described hereinunder. At first, the alarm detection unit 302 acquires those states of various elements in the network unit 30 which are to be transmitted or notified to the agent 20 (step 8001) and checks whether or not the states of the elements exhibit faulty or unusual states (step 8002). If a fault takes place in any one of the states, its element or object name, a degree of importance of an alarm, a cause of the fault, and the like are written into the status storage unit 303 as an alarm data signal (step 8003). Thus, the alarm data signal is representative of a detail of the fault. In addition, an alarm signal which represents occurrence of the fault in the network unit 30 is asynchronously transmitted from the alarm detecting unit 302 by the interruption operation mentioned above, through the third communication unit 301, the interruption line 51, and the second communication unit 211 to the alarm signal detector 204 (step 8004). Thereafter, the alarm detecting unit 302 carries out the alarm detection operation again.

Figure 25:
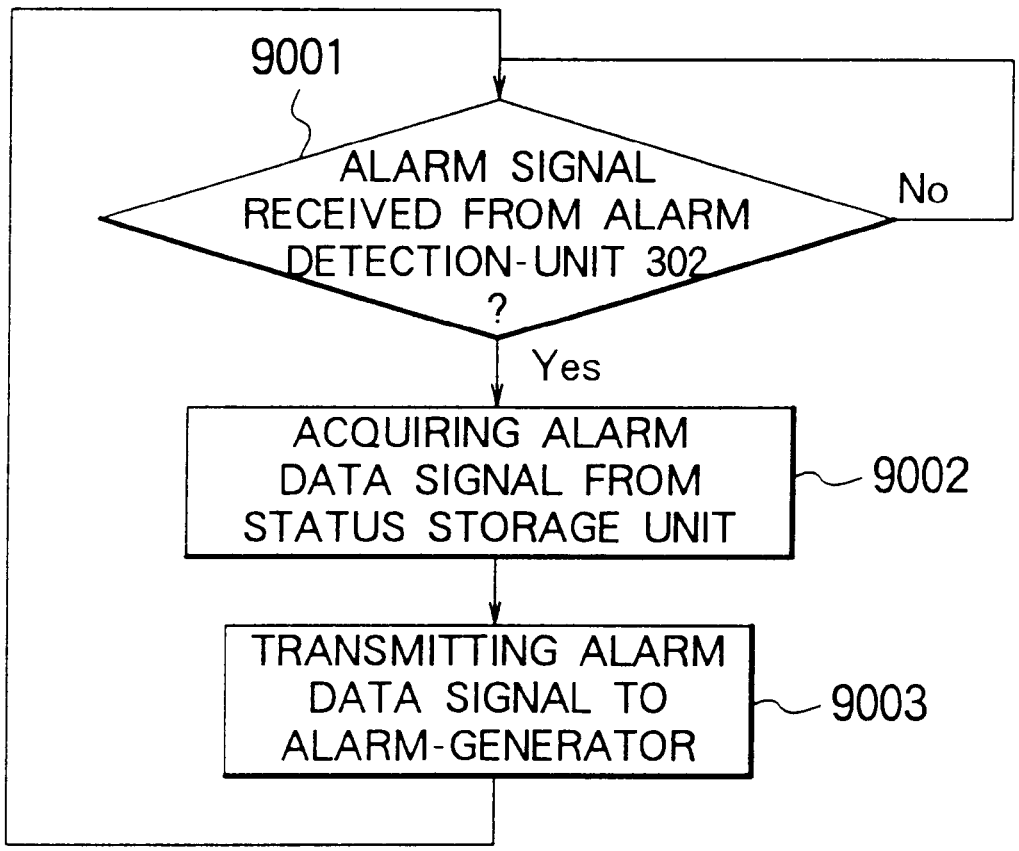
FIG. 25 is a flow chart for use in describing operation of an alarm signal detector included in the agent illustrated in FIG. 18.

Referring to FIG. 25, the alarm signal detector 204 in the agent 20 monitors the alarm signal asynchronously received from the network unit 30 through the interruption line 51 and the second communication unit 211. In other words, the alarm signal detector 204 checks whether or not the alarm signal is received from the alarm detection unit 302 of the network unit 30 (step 9001).

If the alarm signal is received from the alarm detection unit 302, the alarm signal detector 204 in the agent 20 transmits an alarm data extraction request signal to the data access unit 206. The alarm data extraction request signal is indicative of a request of extracting an alarm data signal which is kept in the status storage unit 303. Responsive to the alarm data extraction request signal, the data access unit 206 accesses the interface controller 305 through the second communication unit 211, the downward information line 52, and the third communication unit 301 to make the interface controller 305 read the alarm data signal out of the status storage unit 303.

The alarm data signal which is read out of the status storage unit 303 is sent back to the data access unit 206 through the third communication unit 301, the upward information line 52, and the third communication unit 211 and, as a result, the alarm data signal is finally acquired by the data access unit 206 from the status storage unit 302 (step 9002). The alarm data signal acquired by the data access unit 206 is transmitted through the alarm signal detector 204 to the alarm generator 202 (step 9003).

The second and the third communication units 211 and 301 are connected to each other through two information lines. This means that both the managed data signal and the alaram data signal can be transmitted through the same or common interfaces.

In the illustrated agent 20, the internal alarm detector 203 is also included in addition to the alarm signal detector 204. The internal alarm detector 203 is operable to supervise or monitor managed data signals which are related to alarm detection objects in the agent and which are stored in the management information storage 208. Such monitoring operation may be executed at a predetermined time interval or each time when write-in operation is carried out to the management information storage 208.

In this case, the management inforamtion storage 208 stores alarm production conditions together with the managed data signals to be monitored. Specifically, such alarm production conditions and managed data signals are stored in the storage position memory 2081 of the management information storage 208 illustrated in FIG. 19.

The internal alarm detector 203 acquires the managed data signals from the management information unit 208 and detects whether or not they satisfy the alarm production conditions. On detection of the alarm, the internal alarm detector 203 transmits the alarm data signal to the alarm generator 202.

Figure 26:
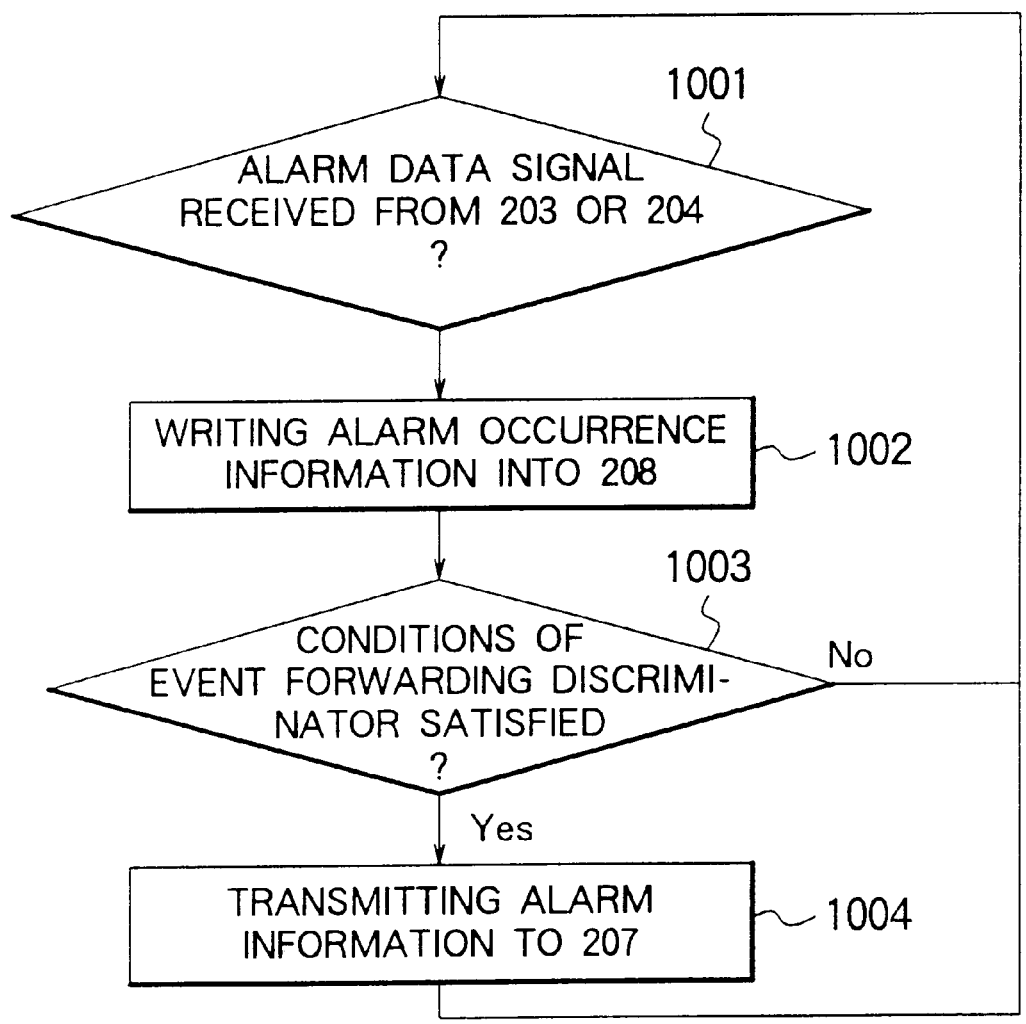
FIG. 26 is a flow chart for use in describing operation of an alarm generator included in the agent illustrated in FIG. 18.

Referring to FIG. 26, description will be directed to operation of the alarm generator 202. The alarm generator 202 detects whether or not the alarm data signal is received from either the alarm signal detector 204 or the internal alarm detector 202 (step 1001). On detection of the alarm data signal, the alarm generator 202 writes information representative of occurrence of an alarm into the management information storage 208 (step 1002) and subsequently reads information of an event forwarding discriminator out of the management information unit 308 (step 1003). The alarm generator 202 checks whether or not the information is matched with the transmission conditions of the event forwarding discriminator (step 1003) and transmits notified contents as alarm information to the management protocol endcoder 207, if the information is matched or satisfied with the transmission conditions.

Figure 27:
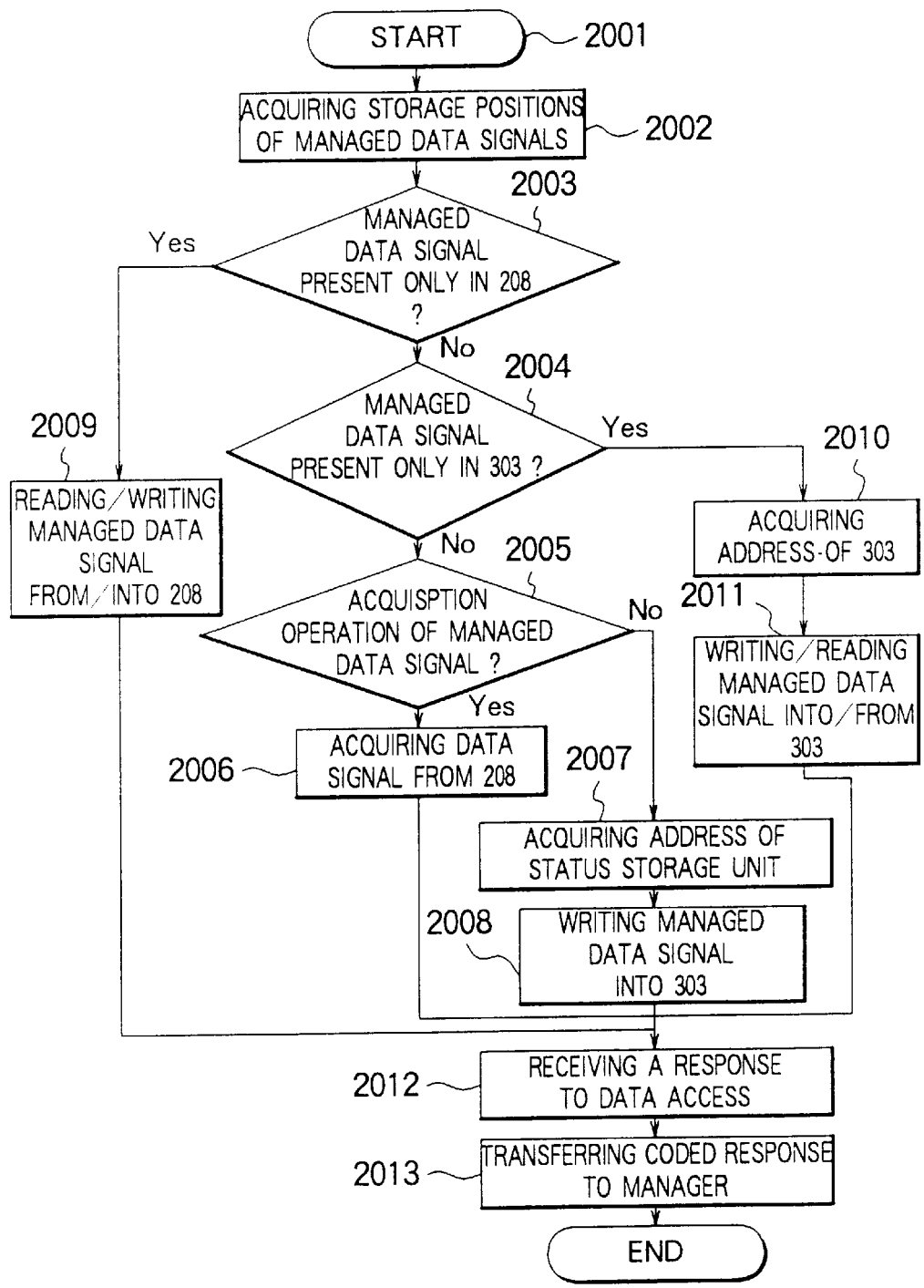
FIG. 27 is a flow chart for use in describing operation of acquiring managed data signals in the network system illustrated in FIG. 18.

Referring to FIG. 27 together with FIG. 1, the data access unit 206 will be described in connection with the management information unit 208. In FIG. 27, the data access unit 206 starts operation (step 2001) and acquires, as storage position information, the storage positions of the managed data signals from the storage position memory 2081 (step 2002). Responsive to the storage position information, the data access unit 206 judges on the basis of the storage position information which one of devices or elements is to be accessed.

Herein, it should be recollected that the managed data signals are divided into the first-through the third-class managed data signals, as mentioned before. In order to determine the class of each managed data signal, the data access unit 208 judges whether or not the managed data signal is present only in the management information storage 208 (step 2003) and judges whether or not it is present only in the status storage unit 303 of the network unit 30 (step 2004).

When the managed data signal is stored in both the management information storage 208 and the status storage unit 303, the data access unit 206 judges through the steps 2003 and 2004 that the managed data signal is the second class data signal, as mentioned before. In addition, the data access unit checks whether or not the operation is a readout operation, namely, an aquisition operation of the managed data signal (step 2005). When the readout operation of the managed data signal is designated as the management operation to acquire the managed data signal in question, the data access unit 206 acquires the managed data signal from the management information storage 208 (step 2006).

On the other hand, when the write-in operation is designated as the management operation, the step 2005 is followed by a step 2007 to acquire an address of the status storage unit 303 in the network unit 30. Thereafter, the managed data signal is written into the address of the status storage unit 303 (step 2008).

At the step 2003, when the managed data signal is stored only in the management information storage 208, the data access unit 206 judges that the managed data signal is the third-class managed data signal. In this event, the step 2003 is followed by a step 2009 at which the managed data signal in question is read out of or written into the storage position memory 2081 of the management information storage 208.

Alternatively, when the data access unit 206 judges at the step 2004 that the managed data signal is stored only in the status storage unit 303 and that the managed data signal is the first-class managed data signal, the data access unit 206 accesses the storage position memory 2081 of the management information storage 208 to acquire an address of the status storage unit 303 at which the managed data signal is stored (step 2010). Thereafter, the managed data signal is written into or read out of the status storage unit 303 (step 2011).

In either case of the first-through the third-class managed data signal, a response is transferred to the management protocol encoder 207 in response to a data access (step 2012) to be coded into a coded signal determined in accordance with the coding rule between the agent 20 and the manager 10 and to be sent to the manager 10 (step 2013).

With this structure, the management information storage 208 has the storage position memory 2081 which stores storage position or location information. Accordingly, it is possible to systematically manage or monitor managed data signals by the manager 10 even when the manage d data signals are dispersed into a plurality of devices, units, or elements.

Figure 28:
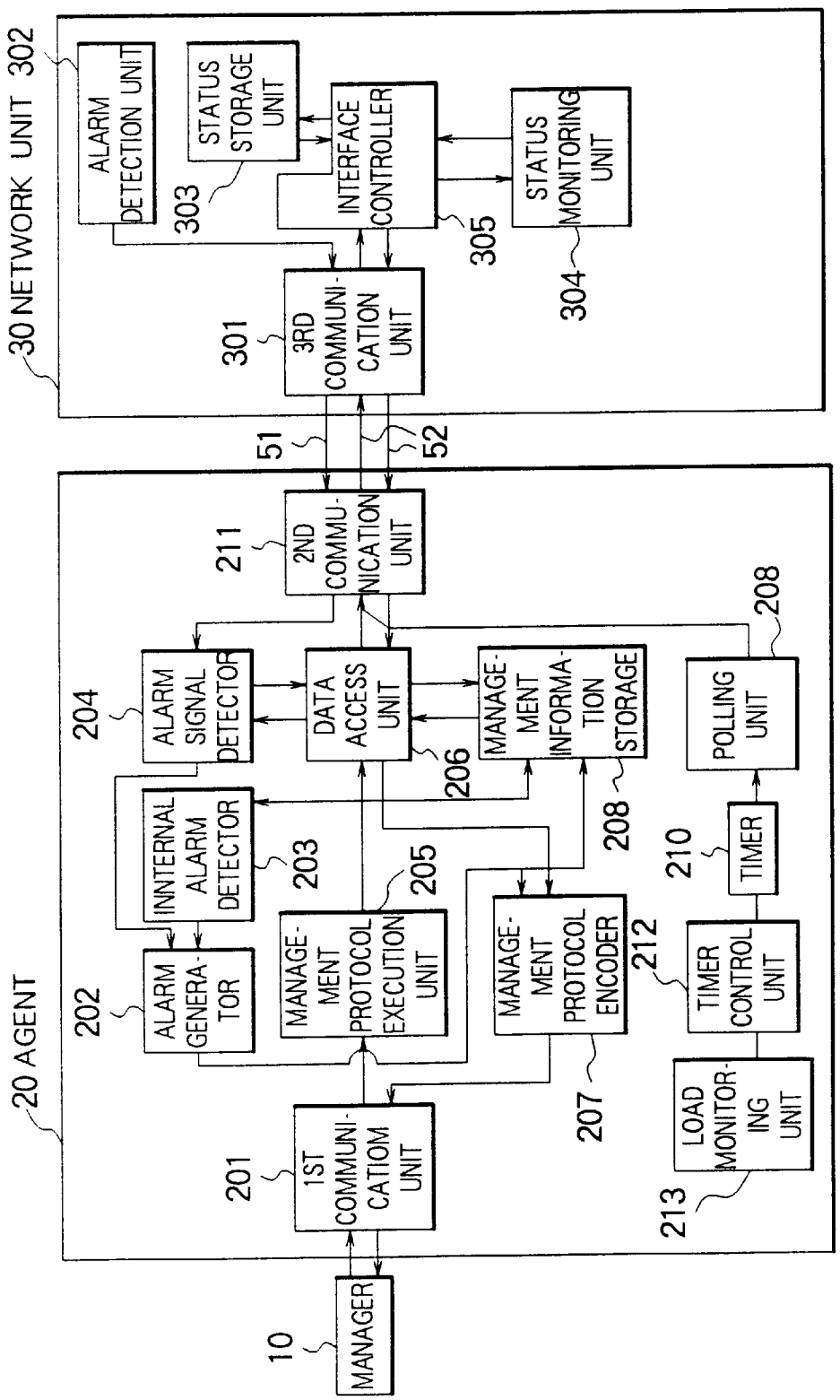
FIG. 28 is a block diagram of a network system according to a third embodiment of this invention.

Refer ring to FIG. 28, a network system according to a third embodiment of this invention is similar in structure and operation to that illustrated in FIG. 18 except that a load monitoring unit 213 and a timer control unit 212 are included in the agent 20. With this structure, it is possible to dynamically modify or change a time interval for extracting data signals from the status storage unit 303 with reference to a load imposed on the agent 20.

More specifically, the load monitoring unit 213 monitors the load imposed on the agent 20 to produce a load signal representative of an amount of the load. Responsive to the load signal, the timer control unit 212 changes a timer setting time from one to another.

Figure 29:
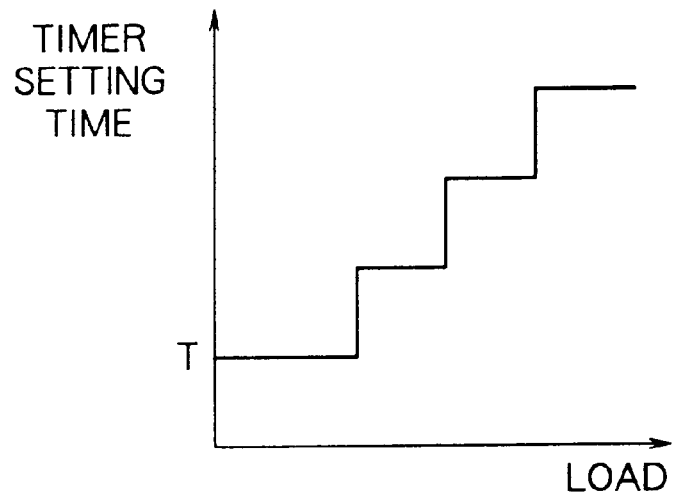
FIG. 29 is a graphical representation for use in describing an example of a relationship between a load and a timer setting time.
Figure 30:
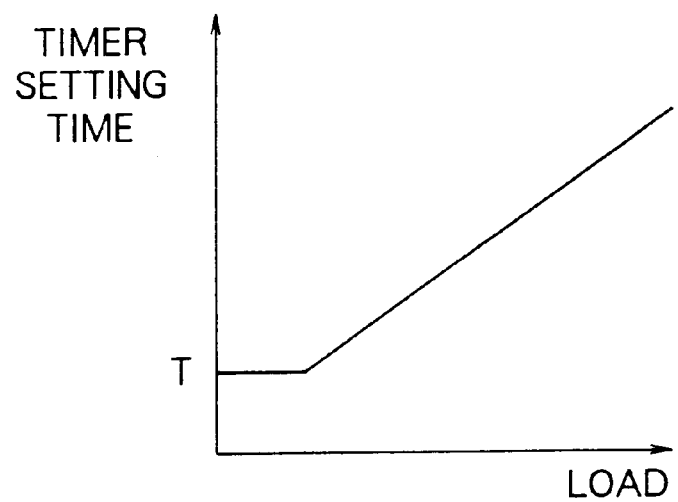
FIG. 30 is a graphical representation for use in describing another relationship between a load and a timer setting time.

The timer setting time of the timer 210 may be changed stepwise by the timer control unit 212 in response to the load, as shown in FIG. 29, while the timer setting time may be continuously changed by the timer control unit 212, as shown in FIG. 30. At any rate, the timer control unit 212 controls the timer 210 so that the timer setting time becomes long with an increase of the load and becomes short with a decrease of the load.

This shows that even when the load imposed on the agent 20 is heavy and a delay inevitably takes place in connection with an operation which requires quickness, such as transmission of an alarm, the load of the agent 20 is lightened by making the polling interval long with reference to the load.

Figure 31:
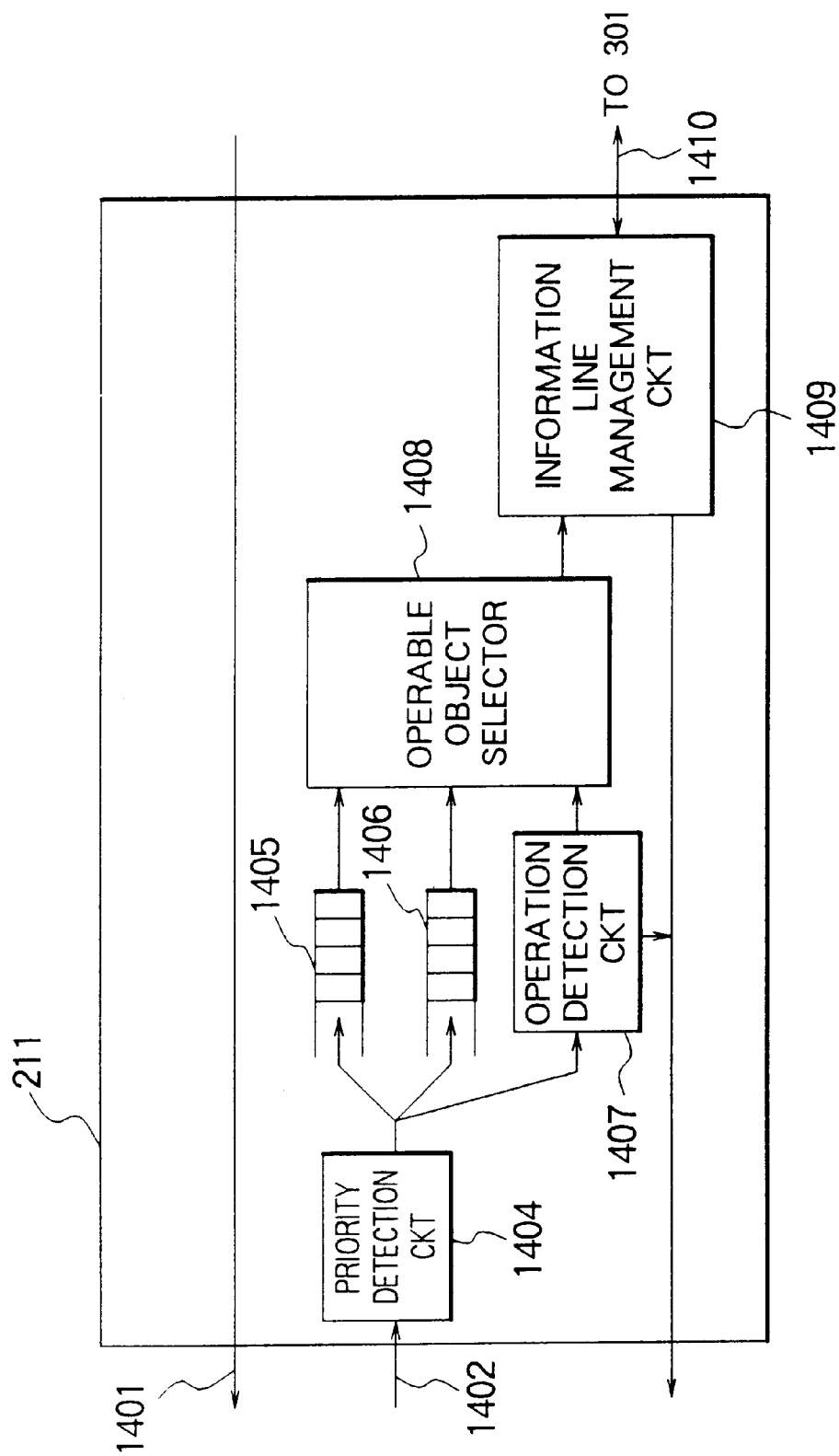
FIG. 31 is a block diagram of another communication unit which is applicable in an agent.

Referring to FIG. 31, a specific example of the second communication unit 211 is illustrated which is connected to an interruption line 1401, an external information line 1402, and an information line 1410. The illustrated second communication unit 211 includes a priority detection circuit 1404, a preference storage circuit 1405, a nonpreference storage circuit 1406, an operation detection unit 1407, an operable object selector 1408, and an information line management unit 1409.

In the example illustrated , an input command is given through the external information line 1402 and may be an operation request command. In this case, such an operation request command should include a degree of priority which is classified into three degrees of priority specified by a high priority, a middle priority, and a low priority and which is distinguished by a label attached to the command.

Under the circumstances, the operation request command which includes the high priority is detected by the priority detection circuit 1404 and is stored into the preference storage circuit 1405. On the other hand, the operation request command of the middle priority is stored into the nonpreference storage circuit 1406 while the operation request command of the low priority is sent to the operation detection circuit 1407.

The operation detection circuit 1407 stores the operation request command only when the third communication unit 301 (FIG. 1) of the network unit 30 does not communicate with the second communication unit 211 illustrated in FIG. 31. Otherwise, the operation detection circuit 1407 returns the operation request command back to a transmission source from which the operation request command is issued.

The operable object selector 1408 reads the operation request command as a readout request command to send the same to the third communication unit 301 through the information line management circuit 1409 and the information line 1410.

In the meanwhile, operation of the operable object selector 1408 will be described hereinunder. At first, the operable object selector 1408 checks whether or not an operation request command is present in the preference storage circuit 1405. The operation request command is sent to the third communication unit 301, if it is present. If no operation request command is stored in both the preference storage circuit 1405 and the nonpreference storage circuit 1406 and an operation request command is stored in th e operation detection circuit 1407 alone, the operation request command is selected by the operable object selector 1408 and is sent to the third communication unit 301.

By the use of the second communication unit 211 shown in FIG. 31, it is possible to carry out alarm detection of the network unit 30, an access operation to the status storage unit 303 based on an indication from the manager 10, and a polling operation.

On the alarm detection, the second communication unit 211 is given from the data access unit 206 an alarm data acquisition command which has a label of a high priority. on the access operation from the manager 10 to the status storage unit 303, the manager 10 issues an operation request command which has a label of the middle priority and which is transmitted to the illustrated second communication unit 211. on the polling operation, the polling unit 209 produces a polling request which has a label of the low priority and transmits the same to the second communication unit 211. When the polling request is rejected by the second communication unit 211, the polling request is sent from the polling unit 209 again to the second communication unit 211 after lapse of a preselected time.

From this fact, it is readily understood that the alarm can be preferentially processed by the second communication unit 211 even when access operation to the status storage unit 303 frequently occurs.

Figure 32:
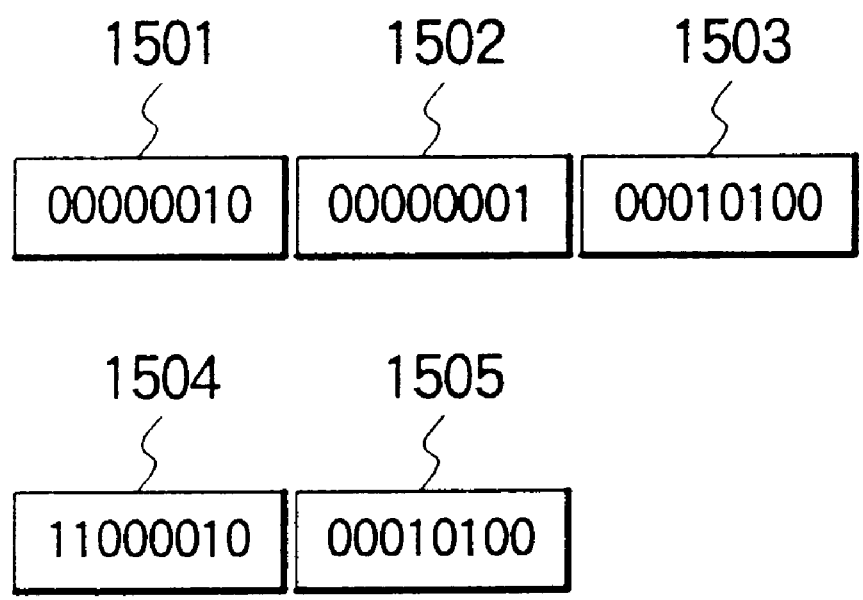
FIG. 32 is a view for describing a coding rule according to this invention.

Referring to FIG. 32, description will be made about a code which can be used as a coded signal in the network system illustrated in the above. In FIG. 32, the code based on ASN.1/BER coding rule is illustrated which has a tag field 1501, a length field 1502, and a value field 1503. The tag field 1501 is used for indiating a attribute of a data signal arranged therein while the length field 1502 indicates an octet number of a value arranged in the value field 1503. In addition, the value is arranged in the value field 1503 in the form of a digital signal coded in accordance with the BER coding rule.

With the above-mentioned code, since each of the fields has a single octet length, three octet lengths are required even if the value field has a single octet length and is subjected to coding. This shows that a data length of a data signal is not restricted in the ASN.1/BER.

On the other hand, a practical data signal mainly has a data length between a single octet and several octets when it is used in the network management.

Taking the above into consideration, the code is structured by a tag field 1504 and a value field 1505 and has two octet lengths. The illustrated tag field 1504 has a private tag which can be individually defined and an additional tag representative of a fixed length of a data signal. Consequently, the length field is omitted from the illustrated code. With this structure, it is possible to shorten the code.

In FIG. 32, an integer which can be represented by a single octet is defined in the tag field 1504. Specifically, the private tag can be defined by arranging "11" at two leading bits of the tag field 1504 while the third bit following the two leading bits serves to specify a flag indicative of a data structure and is rendered into "0" to indicate a structural type of the data structurre. The following five bits represent an integer by "00010". If a data signal which is represented by the integer "20" of a single octet is coded, a first code "11000010" is arranged in the tag field 1504 and a second code "00010100" which corresponds to "20" is arranged in the value field 1505. Thus, a combination of the codes is represented by "1100001000010100" and is shorter than the combination of the codes 1501, 1502, and 1503 as shown in FIG. 32. As a result, the code length of the combination of the codes 1504 and 1505 is equal to two-third of the code lengths determined by the combination of the codes 1501, 1502, and 503. This applies to ASN. 1 type of a fixed length.

While this invention has thus far been described in conjunction with several embodiments thereof, it will readily be possible for those skilled in the art to put this invention into practice in various other manners.

What is claimed is:

1. A network system comprising a managing unit and a plurality of managed units which are managed by the managing unit and which are connected to the managing unit through a transmission path, each of said managed units comprising:

a first internal memory having a transfer area which stores a managed data signal of each of the managed units renewable into a current managed data signal; and a first communication management unit, which is located between the first internal memory and the transmission path, for carrying out an access operation of that zone of the first internal memory which is indicated by the managing unit to notify the managing unit of a result of the access operation;

said managing unit comprising:

a second communication management unit connected to each of the managed units through the transmission path; and a polling processing unit for notifying each of the managed units of that zone of the first internal memory which is to be polled to acquire the managed data signal from the zone at a time when said each of the managed units is polled, respectively.

2. A network system comprising a plurality of managed units and a managing unit which is connected to a transmission path and which manages the managed units, each of said managed units comprising:

a first internal memory, which has a plurality of first memory addresses determining a plurality of zones in a transfer area, for storing, in the transfer area, first, second, and third groups of managed data signals which are to be processed in different manners and which are renewed into first, second, and third current managed data signals, respectively; and a first communication management unit, which is located between the first internal memory and the transmission path and which is responsive to an indication from the managing unit, for accessing those zones of the first internal memory which are indicated by the indication to transmit, as a result of the access, the first, the second, and the third current managed data signals through the transmission path at a time in response to the indication;

said managing unit comprising:
a second communication management unit connected to the transmission path;
a second internal memory, having a plurality of second memory addresses specifying second memory areas, for transcribing contents of the transfer area of the first internal memory of each of the managed units;
an information storage unit for keeping the second memory addresses which define the second memory areas for transcribing the first, the second, and the third current managed data signals and which are related to the zones determined by the first memory addresses; and
a polling processing unit, coupled to the information storage unit, for detecting the zones of the first, the second, and third current managed data signals in the first memory transfer area to notify each managed unit of the zones of the first through the third current managed data signals in the form of the indication and to acquire the first through the third current managed data signals at a time from each managed unit.

3. A network system as claimed in claim 2, wherein the first group of the managed data signals specifies a data signal group to be transcribed into one of the second memory areas that corresponds in the second internal memory to one of the zones in the first internal memory while the second group of the managed data signals specifies a data signal group to be compared with previous values stored in the second internal memory, the third group of the managed data signals specifying a data signal group to be compared with threshold values.

4. A network system as claimed in claim 3, wherein the managing unit further comprises:
an event notifying the system of unit for notifying an event which is detected in the managing unit;
said polling processing unit processing the first through the third current managed data signal which correspond to the first through the third groups of the managed data signal, respectively, so that first current managed data signals are transcribed into the one of the second memory areas while the second current managed data signals are compared with the previous values and are transcribed in another one of the second memory areas only on coincidence between the second current managed data signals and the previous values and are notified to the event notifying unit only on the coincidence therebetween and so that the third current managed data signals are compared with the threshold values to be notified to the event notifying unit only when the third current managed data signals cross the threshold values.

5. A network system as claimed in claim 4, wherein the managing unit further comprises:
an address converter, coupled to the polling processing unit, the information storage unit, and the second communication management unit, for carrying out address conversion between the first memory addresses and the second memory addresses.

6. A network system as claimed in claim 2, wherein the managed data signals further include a fourth group of the managed data signals which is to be asynchronously transmitted from each of the managed units to the managing unit when the fourth group of the managed data signals is varied.

7. A network system as claimed in claim 6, wherein the first internal memory stores the fourth group of the managed data signals which are renewed into fourth current data signals and to which memory addresses are assigned; and
the first communication management unit asynchronously informs the managing unit of the fourth current data signals and the corresponding addresses when the fourth current data signals are varied.

8. A network system as claimed in claim 7, wherein the information storage unit in the managing unit keeps additional memory addresses which define additional memory areas for transcribing the fourth current data signals and which are related to additional zones determined by additional memory addresses;
the managing unit further comprising:
an asynchronous event processing unit for transcribing the fourth current data signals into the additional memory areas in the second internal memory in response to the fourth current data signals and the additional memory addresses.

9. A network system as claimed in claim 8, wherein the managing unit further comprises:
an address converter, coupled to the polling processing unit, the information storage unit, the second communication management unit, and the asynchronous event processing unit for carrying out address conversion between the first memory addresses and the second memory addresses.

10. A network system as claimed in claim 2, wherein the first communication management unit of each managed unit is for transmitting a physical communication address assigned to each managed unit together with a species of each managed unit to the managing unit on initialization of each managed unit while the second communication management unit is for allocating a logical communication address which corresponds to the physical communication address by selecting a logical communication address group related to the species of each managed unit to transmit the allocated logical communication address to each managed unit and to keep a relationship between the physical communication address and the allocated logical communication address.

11. A network system as claimed in claim 10, wherein the first communication management unit is for transmitting, to the managing unit, a package information signal representative of memory arrangement information in each managed unit on initialization of each managed unit while the second communication management unit sends, to the information storage unit, management information based on the package information signal.

12. A network system comprising a managing unit and a plurality of managed units which are managed by the managing unit and which are connected to the managing unit through a transmission path, each of said managed units comprising:
a first internal memory having a transfer area and a nontransfer area, for storing managed data signals which are related to each of the managed units, the managed data signals stored in the transfer area and the nontransfer area being renewable into current managed at a signals; and
a first communication management unit, which is located between the first internal memory and the transmission path, for carrying out an access operation of that zone in the first internal memory which is indicated by the managing unit to notify the managing unit of a result of the access operation;

said managing unit comprising:

a second communication management unit connected to each of the managed units through the transmission path; and an on demand access processing unit for notifying each of the managed units of that zone of the first internal memory which is to be accessed to acquire the managed data signal from the transfer and the non-transfer areas at a time when said each of the managed units is accessed, respectively, by the on demand access processing unit.

13. A network system as claimed in claim 12, wherein the on demand access processing unit comprises:

an on demand access execution unit for setting data signals into the first nontransfer area of the internal memory through the second communication management unit at a time by indicating the nontransfer area to be accessed and the data signals to be stored in the nontransfer area.

14. A network system comprising a managing unit and a plurality of managed units which are managed by the managing unit and which are connected to the managing unit through a transmission path, each of said managed units comprising:

a first internal memory having a transfer area and a nontransfer area, for storing managed data signals which are related to each of the managed units, the managed data signals stored in the transfer area and the nontransfer area being renewable into current managed data signals; and a first communication management unit, which is located between the first internal memory and the transmission path, for carrying out an access operation of that zone of the first internal memory which is indicated by the managing unit to notify the managing unit of a result of the access operation;

said managing unit comprising:

a second communication management unit connected to each of the managed units through the transmission path;

an information storage unit for keeping a relationship of addresses between the transfer area of the first internal memory and a corresponding memory area of a second internal memory and a relationship between addresses of the nontransfer area of the first internal memory and corresponding virtual addresses of the second internal memory;

an on demand access processing unit for notifying each of the managed units of the zone of the first internal memory which is to be accessed to acquire the managed data signal from the transfer and the non-transfer areas at a time when said each of the managed units is accessed, respectively, by the on demand access processing unit, by converting the areas between the first and the second internal memories; and an address converter coupled to the on demand access processing unit for carrying out address conversion between the first and the second internal memories.

15. A network system as claimed in claim 14, wherein the first communication management unit asynchronously transmits, to the managing unit, a specific managed data signal and the corresponding address of the first internal memory when the specific managed data signal results from a variation of the managed data signals and is to be urgently informed to the managing unit;

the managing unit further comprising:

an asynchronous event processing unit responsive to the specific managed data signal and the corresponding address for transcribing the specific managed data signal into the second internal memory with reference to the corresponding address.

16. A network system as claimed in claim 15, wherein the managing unit further comprises:

an event information unit for informing the system of an occurrence of an event; and said asynchronous event processing unit informs the event information unit of an occurrence of the specific managed data signal.

17. A network system as claimed in claim 15, wherein the first communication management unit transmits a species of each managed unit and a physical communication address assigned to each managed unit on initialization of each managed unit to the managing unit; and the second communication management unit allocates a logical communication address corresponding to the physical communication address by selecting a logical communication address group related to the species of each managed unit and keeps a relationship between the logical communication address and the physical communication address.

18. A network system as claimed in claim 17, wherein the first communication management unit further transmits a package information signal representative of memory arrangement information of the managed data signals in the first internal memory; and the second communication management unit produces a management information signal based on the package information signal.

19. A network system for use in communication between a network unit and a managing unit through an information line to monitor the network unit from the managing unit by carrying out an access operation of the network unit from the managing unit to transfer managed data signals from the network unit to the managing unit on the access operation, the managing unit being accessed by the network unit on occurrence of a fault in the network unit to transfer an alarm data signal representative of a detail of the fault from the network unit to the managing unit, the network system comprising:

an information path connected between the managing unit and the network unit to carry out the access operation of the network unit from the managing unit to transfer both the managed data signals and the alarm data signal from the network unit to the managing unit; and an interruption line connected between the managing unit and the network unit to transfer an alarm signal which is representative of occurrence of the fault in the network unit and which is sent from the network unit to the managing unit before transfer of the alarm data signal.

20. A network system as claimed in claim 19, wherein the managing unit is operable as an agent of a manager and comprises:

an agent communication interface which is used in common to both the managed data signals and the alarm data signal; and the network unit comprises:
a network communication interface which is also used in common to both the managed data signals and the alarm data signal.

21. A network system as claimed in claim 20, wherein the agent communication interface accommodates both the information path and the interruption line while the network communication interface also accommodates both the information path and the interruption line.

22. A network system as claimed in claim 21, wherein the network unit further comprises:
an alarm detecting unit for detecting occurrence of the fault to send the alarm signal to the interruption line through the network communication interface;
a status storage unit for storing the alarm data signal; and
a controller for controlling the network communication interface to transmit the alarm data signal to the information path through network communication interface.

23. A network system as claimed in claim 22, wherein the managing unit further comprises:
an alarm signal detector connected to the agent communication interface for detecting the alarm signal sent through the agent communication interface to produce a request to extract the alarm data signal from the network unit; and
a data access unit connected to the alarm signal detector and the agent communication interface for accessing the network unit through the agent communication interface and the information path in response to the request to extract the alarm data signal from the network unit.

24. A network system as claimed in claim 23, wherein the network unit further comprises:
a status monitoring unit for monitoring the managed data signals which are necessary for a management operation of the network system;
the status storage unit being connected to the status monitoring unit for storing the managed data signals together with the alarm data signal.

25. A network system as claimed in claim 24, wherein the the agent comprises:
a polling unit connected to the agent communication unit for transmitting, to the network interface, a polling signal which specifies a command representative of acquiring the managed data signals through the agent communication interface and the information path to the network unit; and
a timer connected to the polling unit for periodically energizing the polling unit.

26. A network system as claimed in claim 25, wherein the data access unit acquires, along with the alarm data signal, the managed data signals which are sent from the network unit in response to the polling signal;
the agent further comprising:
a management data storage connected to the data access unit for storing the managed data signals and the alarm data signal together with position signals related to the managed data signals and the alarm data signal.

27. A network system as claimed in claim 26, wherein the management data storage has a managed data memory for storing the managed data signals and the alarm data signal and a storage position memory for storing the position signals.

28. A network system as claimed in claim 26, wherein the managed data signals are classified into a first class of data signals stored in the status storage unit of the network unit alone, a second class of data signals stored in both the status storage unit of the network unit and the management data storage of the agent, and a third class of data signals stored in the management data storage of the agent alone.

29. A network system as claimed in claim 28, wherein
the data access unit of the agent accesses the status storage unit through the agent communication interface to read and write the first class of data signals from and into the status storage unit of the network unit, when the managed data signals are the first class of data signals;
the data access unit of the agent reads the second class of data signals out of the management data storage of the agent and writes the same into the status storage unit of the network unit through the agent communication unit when the managed data signals are the second class of data signals;
the data access unit of the agent reads and writes the third class of data signals out of and into the management data storage of the agent when the managed data signals are the third class of data signals.

30. A network system as claimed in claim 29, wherein the data access unit of the agent acquires the second class of data signals stored in the status storage unit of the network unit, in response to the polling signal the second class of data signals acquired from the network unit being copied into the management data storage.

31. A network system as claimed in claim 30, wherein the access data unit of the agent preferentially extracts the alarm data signal from the management data unit in comparison with the remaining managed data signals when the request of the extracting the alarm data signal is issued from the alarm signal detector.

32. A network system as claimed in claim 25, wherein the agent further comprises:
a load monitoring unit for monitoring a load imposed on the agent to produce a load signal which is representative of the load currently imposed on the agent;
a timer control unit connected to the load monitoring unit and the timer for controlling the timer to change a timer period in response to the load signal and, as a result, to change a polling time interval of the polling signal.

33. A network system as claimed in claim 32, wherein the timer control unit controls the timer so that the polling time interval of the polling signal becomes longer when the load monitoring unit produces a load signal which is representative of an increased load in the agent and, otherwise, the polling time interval becomes shorter.

34. A network system as claimed in claim 20, wherein the agent communication interface comprises:
a priority detection circuit for detecting a degree of priority of a data acquisition command indicative of acquisition of a managed data signals from the network unit;
storing means for individually storing the managed data signals in accordance with the degree of priority; and selecting means for selecting the data acquisition command on the basis of the degree of priority.

35. A network system as claimed in claim 34, wherein a highest degree of priority is given to an acquisition command to acquire the alarm data signal.

36. A network system as claimed in claim 35, wherein the agent further comprises:

a management protocol execution unit which is operable with a manager in accordance with a predetermined coding rule between the agent and the manager, the predetermined coding rule defining a data length and a data type collected to shorten a coded data length.

* * * * *